US008873610B2

(12) United States Patent
Dark

(10) Patent No.: US 8,873,610 B2
(45) Date of Patent: Oct. 28, 2014

(54) IQ BASEBAND MATCHING CALIBRATION TECHNIQUE

(71) Applicant: National Instruments Corporation, Austin, TX (US)

(72) Inventor: Stephen L. Dark, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 14/186,727

(22) Filed: Feb. 21, 2014

(65) Prior Publication Data

US 2014/0241410 A1 Aug. 28, 2014

Related U.S. Application Data

(60) Provisional application No. 61/768,326, filed on Feb. 22, 2013.

(51) Int. Cl.
*H04B 3/46* (2006.01)
*H04B 17/00* (2006.01)
*H04Q 1/20* (2006.01)
*H04B 1/12* (2006.01)

(52) U.S. Cl.
CPC ........................................ *H04B 1/12* (2013.01)
USPC ............................. 375/226; 375/224; 375/228

(58) Field of Classification Search
USPC ........................... 375/224, 226, 228, 345, 371
See application file for complete search history.

(56) References Cited

U.S. PATENT DOCUMENTS

2010/0312515 A1* 12/2010 Miyasaka ...................... 702/106
2011/0109321 A1* 5/2011 Kawabata et al. ............. 324/555

* cited by examiner

*Primary Examiner* — Curtis Odom
(74) *Attorney, Agent, or Firm* — Meyertons Hood Kivlin Kowert & Goetzel, P.C.; Jeffrey C. Hood; Mark K. Brightwell

(57) ABSTRACT

The first and second outputs of a signal generation system are coupled to the first and second inputs of a signal digitizing system via respective electrical conductors. A controller directs the generation system to generate a first calibration signal, and the digitizing system responsively captures a first set of vector samples. The conductors are then reconfigured so they connect the first and second outputs of the generation system respectively to the second and first inputs of the digitization system. The controller then directs the generation system to generate a second calibration signal, and the digitizing system responsively captures a second set of vector samples. The controller or other processing agent computes gain and/or phase impairments using the first and second vector sample sets. Digital filter parameters may be computed based on the computed impairment(s), and used to correct the impairment(s) of the generation system and/or the digitizing system.

37 Claims, 16 Drawing Sheets

100 

After a first output and a second output of the signal generation system has been connected respectively to a first input and a second input of the signal digitizing system using respectively a first electrical conductor and a second electrical conductor, direct the signal generation system to generate a first vector calibration signal and to transmit a first vector output signal via the first output and the second output based on the first vector calibration signal, and direct the signal digitizing system to capture a first set of vector samples from the first input and second input in response to the transmission of the first vector output signal
110

After the first output and the second output of the signal generation system have been connected respectively to the second input and the first input of the signal digitizing system using the first and second electrical conductors, direct the signal generation system to generate a second vector calibration signal and transmit a second vector output signal based on the second vector calibration signal, and direct the signal digitizing system to capture a second set of vector samples from the first input and second input in response to the transmission of the second vector output signal   115

Compute a measurement of gain and/or phase imbalance of the signal generation system and/or a measurement of gain and/or phase imbalance of the signal digitizing system based on input data including the first set of vector samples and the second set of vector samples
120

> Program a digital correction circuit in the signal generation system to implement a digital filter, wherein the digital correction circuit is configured at a location upstream from digital-to-analog conversion in the signal generation system, wherein the digital filter includes at least one inline filter and at least one cross filter, wherein each inline filter is applied to either the first signal output path or the second signal output path of the signal generation system, wherein each cross filter crosses from the first signal output path to the second signal output path or vice versa   210

FIG. 2

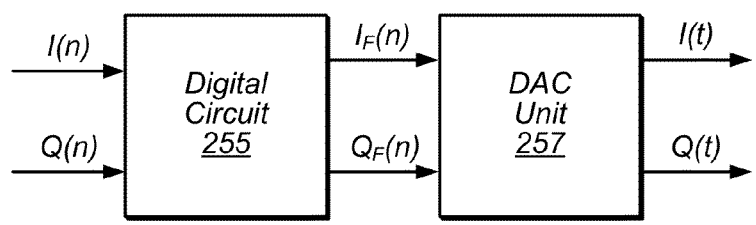

> Program a digital correction circuit in the signal digitizing system to implement a digital filter, wherein the digital correction circuit is configured at a location downstream from analog-to-digital conversion in the signal digitizing system, wherein the digital filter includes at least one inline filter and at least one cross filter, wherein each inline filter is applied to either the first signal input path or the second signal input path of the signal digitizing system, wherein each cross filter crosses from the first signal input path to the second signal input path or vice versa   310

FIG. 3

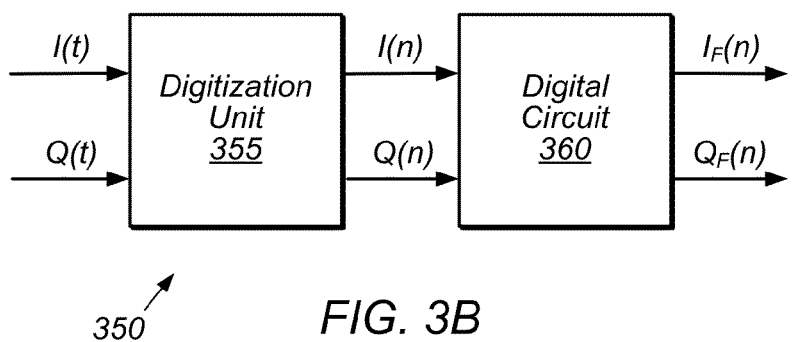

FIG. 3B $$\begin{bmatrix} j & g_{in}(f)e^{j\phi_{in}(f)} \\ j & -g_{in}(-f)e^{-j\phi_{in}(-f)} \end{bmatrix} \begin{bmatrix} U(f) \\ V(f) \end{bmatrix} = \begin{bmatrix} g_{out}(f)e^{j\phi_{out}(f)} \\ -g_{out}(-f)e^{-j\phi_{out}(-f)} \end{bmatrix} \quad (7.10)$$

$$\begin{bmatrix} U(f) \\ V(f) \end{bmatrix} = \frac{\begin{bmatrix} -g_{in}(-f)e^{-j\phi_{in}(-f)} & -g_{in}(f)e^{j\phi_{in}(f)} \\ -j & j \end{bmatrix} \begin{bmatrix} g_{out}(f)e^{j\phi_{out}(f)} \\ -g_{out}(-f)e^{-j\phi_{out}(-f)} \end{bmatrix}}{-j*g_{in}(-f)e^{-j\phi_{in}(-f)} - jg_{in}(f)*e^{j\phi_{in}(f)}} \quad (7.11)$$

$$\begin{bmatrix} U(f) \\ V(f) \end{bmatrix} = \frac{\begin{bmatrix} jg_{in}(-f)e^{-j\phi_{in}(-f)} & jg_{in}(f)e^{j\phi_{in}(f)} \\ -1 & 1 \end{bmatrix} \begin{bmatrix} g_{out}(f)e^{j\phi_{out}(f)} \\ -g_{out}(-f)e^{-j\phi_{out}(-f)} \end{bmatrix}}{-g_{in}(-f)e^{-j\phi_{in}(-f)} - g_{in}(f)e^{j\phi_{in}(f)}} \quad (7.12)$$

$$U(f) = j \frac{g_{in}(f)g_{out}(f)e^{j(\phi_{in}(f)-\phi_{out}(-f))} - g_{in}(-f)g_{out}(f)e^{j(\phi_{out}(f)-\phi_{in}(-f))}}{g_{in}(f)e^{j\phi_{in}(f)} + g_{in}(-f)e^{-j\phi_{in}(-f)}} \quad (7.13)$$

$$V(f) = \frac{g_{out}(f)e^{j\phi_{out}(f)} + g_{out}(-f)e^{-j\phi_{out}(-f)}}{g_{in}(f)e^{j\phi_{in}(f)} + g_{in}(-f)e^{-j\phi_{in}(-f)}} \quad (7.14)$$

FIG. 14

IQ BASEBAND MATCHING CALIBRATION TECHNIQUE

PRIORITY CLAIM INFORMATION

This application claims the benefit of priority to U.S. Provisional Application No. 61/768,326, filed on Feb. 22, 2013, entitled "IQ Baseband Matching Calibration Technique", invented by Stephen L. Dark, which is hereby incorporated by reference in its entirety as though fully and completely set forth herein.

FIELD OF THE INVENTION

The present invention relates to the field of electronic system calibration, and more particularly to an apparatus and method for measuring I/Q impairments and correcting those impairments for systems coupled in series.

DESCRIPTION OF THE RELATED ART

Quadrature (also known as homodyne, direct conversion or zero-IF) RF architectures convert between a pair of baseband signals (in-phase and quadrature phase) and RF signals. In the case of a vector signal analyzer (VSA), a quadrature demodulator is employed, while in the case of a Vector Signal Generator (VSG) a quadrature modulator is used to perform this conversion. In both cases, two analog baseband signals are required.

A common problem with this type of RF architecture are the vector impairments that are directly related to image rejection. These impairments occur due to many imperfections in the hardware which are usually summarized into two different values: gain imbalance and phase skew. (Phase skew is also referred to herein as "phase imbalance".) One source of these imperfections are the baseband signals themselves. In order to not produce an effective image at RF, the baseband signals must be perfectly matched in both magnitude and phase across all baseband frequencies.

In many systems, the baseband portion of the design is separated from the RF portion of the design. In these types of systems where the device is not calibrated together as one system, it becomes important to properly calibrate each subsystem accurately. Often, each subsystem is tested separately for proper operation. In one such use case, it is important to supply properly calibrated baseband signals to the RF DUTs. (DUT is an acronym for "Device Under Test".) This could be to test an IQ modulator or demodulator, or to test the baseband subsystem.

However, before the correction/calibration can be done, the baseband matching has to be measured. This becomes a very difficult measurement to perform given the accuracies that are needed. In fact, the accuracies that are required for image rejections less than −60 dB either do not exist or are not specified in the test and measurement market.

As stated above, the test and measurement market currently does not have product offerings that maintain the needed specifications for both gain matching and phase matching. As a result customized methods must be used to make the needed measurements. Gain imbalance measurements are much easier to make than the phase measurements. In the case of input gain matching, a common source can be used to measure the amplitude response of each input channel in sequence where the two responses are then subtracted (subtracted in dB, or divided in voltage). The same can be accomplished for output gain matching where each output is applied to a single input of a digitizer in sequence. Also power meters at low frequencies have great amplitude accuracies and therefore two different power meters could be used together. However, these methods do not account for phase matching.

SUMMARY

In some embodiments, a method for determining gain and/or phase imbalance of a signal generation system and/or a signal digitizing system may include the following operations.

After a first output and a second output of the signal generation system has been connected respectively to a first input and a second input of the signal digitizing system using respectively a first electrical conductor and a second electrical conductor, the method may include: directing the signal generation system to generate a first vector calibration signal and to transmit a first vector output signal via the first output and the second output based on the first vector calibration signal; and directing the signal digitizing system to capture a first set of vector samples from the first input and second input in response to the transmission of the first vector output signal.

After the first output and the second output of the signal generation system have been connected respectively to the second input and the first input of the signal digitizing system using the first and second electrical conductors, the method may include: directing the signal generation system to generate a second vector calibration signal and transmit a second vector output signal based on the second vector calibration signal; and directing the signal digitizing system to capture a second set of vector samples from the first input and second input in response to the transmission of the second vector output signal.

The method may also include computing a measurement of gain and/or phase imbalance of the signal generation system and/or a measurement of gain and/or phase imbalance of the signal digitizing system based on input data including the first set of vector samples and the second set of vector samples.

In some embodiments, the signal generation system may include a single dual-channel waveform generator or two single-channel waveform generators. Furthermore, the signal digitizing system may include a single dual-channel waveform digitizer or two single-channel waveform digitizers.

In one set of embodiments, a computer system for determining gain and/or phase imbalance of a signal generation system and/or a signal digitizing system may include a processor and memory. (The signal generation system includes a first output and a second output, and the signal digitizing system includes a first input and a second input.)

The memory stores program instructions, where the program instructions, when executed by the processor, cause the processor to perform the following operations.

In response to a first signal indicating that a first connection configuration has been achieved between the first and second outputs of the signal generation system and the first and second inputs of the signal digitizing system, the processor directs the signal generation system to generate a first vector calibration signal and transmit a first vector output signal via the first and second outputs based on the first vector calibration signal, and directs the signal digitizing system to capture a first set of vector samples from the first input and second input in response to the transmission of the first vector output signal. The first connection configuration includes a connection of a first electrical conductor between the first output and the first input, and a connection of a second electrical conductor between the second output and the second.

In response to a second signal indicating that a second connection configuration has been achieved between the first and second outputs of the signal generation system and the first and second inputs of the signal digitizing system, the processor directs the signal generation system to generate a second vector calibration signal and transmit a second vector output signal via the first and second outputs based on the second vector calibration signal, and directs the signal digitizing system to capture a second set of vector samples from the first input and second input in response to the transmission of the second vector output signal. The second connection configuration includes the first and second electrical conductors being configured so that the first output is connected to the second input, and second output is connected to the first input.

The processor may compute a measurement of gain and/or phase imbalance of the signal generation system and/or a measurement of gain and/or phase imbalance of the signal digitizing system based on input data including the first set of vector samples and the second set of vector samples.

In some embodiments, the computer system includes an automated system configured to connect and disconnect the first and second electrical conductors from the first and second outputs of the signal generation system and the first and second inputs of the signal digitizing system in order to achieve the first connection configuration or the second connection configuration upon command from the processor.

In one set of embodiments, a computer system for determining gain and/or phase imbalance of a signal generation system and/or a signal digitizing system may include a processor and memory. (The signal generation system includes a first output and a second output, and the signal digitizing system includes a first input and a second input.)

The memory stores program instructions, where the program instructions, when executed by the processor, cause the processor to perform the following operations.

In response to a first indication indicating that a first connection configuration has been achieved between the first and second outputs of the signal generation system and the first and second inputs of the signal digitizing system, the processor directs the signal generation system to generate a first vector calibration signal and transmit a first vector output signal via the first and second outputs based on the first vector calibration signal, and directs the signal digitizing system to capture a first set of vector samples in response to the transmission of the first vector output signal. The first connection configuration includes an electrical connection between the first output and the first input, and an electrical connection between the second output and the second input.

In response to a second indication indicating that a second connection configuration has been achieved between the first and second outputs of the signal generation system and the first and second inputs of the signal digitizing system, the processor directs the signal generation system to generate a second vector calibration signal and transmit the second vector output signal via the first and second outputs based on the second vector calibration signal, and directs the signal digitizing system to capture a second set of vector samples in response to the transmission of the second vector calibration signal. The second connection configuration includes an electrical connection between the first output and the second input, and an electrical connection between the second output and the first input.

The processor may compute a measurement of gain and/or phase imbalance of the signal generation system and/or a measurement of gain and/or phase imbalance of the signal digitizing system based on input data including the first set and the second set of vector samples.

In some embodiments, an electronic switching device is coupled to the first and second outputs of the signal generation system and the first and second inputs of the signal digitizing system, wherein the electronic switching device is configured to establish the first connection configuration or the second connection configuration upon command from the processor.

In some embodiments, the electronic switching device includes one or more relays.

In one set of embodiments, a method for correcting baseband gain and/or phase imbalance impairments between a first signal output path and a second signal output path in a signal generation system may include the following operations.

The method may include programming a digital correction circuit in the signal generation system to implement a digital filter, wherein the digital correction circuit is configured at a location upstream from digital-to-analog conversion in the signal generation system. The digital filter includes at least one inline filter and at least one cross filter, wherein each inline filter is applied to either the first signal output path or the second signal output path, and each cross filter crosses from the first signal output path to the second signal output path or vice versa. Parameters of said at least one inline filter and parameters of said at least one cross filter have been determined based on: (1) a first set of vector samples captured by a signal digitizing system in response to the signal generation system's transmission of a first vector calibration signal with a first connection configuration between two outputs of the signal generation system and two inputs of the signal digitizing system; and (1) a second set of vector samples captured by the signal digitizing system in response to the signal generation system's transmission of a second vector calibration signal with a crossed connection configuration between the two outputs of the signal generation system and the two inputs of the signal digitizing system.

In some embodiments, the digital filter includes only one inline filter and only one cross filter, wherein the inline filter and cross filter are configured so that only one of the following conditions hold:

(a) the inline filter is applied to the second signal output path and the cross filter crosses from the first signal output path to the second signal output path;

(b) the inline filter is applied to the second signal output path and the cross filter crosses from the second signal output path to the first signal output path;

(c) the inline filter is applied to the first signal output path and the cross filter crosses from the first signal output path to the second signal output path;

(d) the inline filter is applied to the first signal output path and the cross filter crosses from the second signal output path to the second signal output path.

In one set of embodiments, a method for correcting baseband I/Q gain and/or phase imbalance impairments between a first signal input path and a second signal input path in a signal digitizing system may include the following operations.

The method may include programming a digital correction circuit in the signal digitizing system to implement a digital filter, wherein the digital correction circuit is configured at a location downstream from analog-to-digital conversion in the signal digitizing system. The digital filter includes at least one inline filter and at least one cross filter, wherein each inline filter is applied to either the first signal input path or the second signal input path, wherein each cross filter crosses from the first signal input path to the second signal input path or vice versa. The parameters of said at least one inline filter and parameters of said at least one cross filter have been determined based on: (1) a first set of vector samples captured by the signal digitizing system in response to a transmission of a first vector calibration signal by a signal generation system with a first connection configuration between two outputs of the signal generation system and two inputs of the signal digitizing system; and (2) a second set of vector samples captured by the signal digitizing system in response to the signal generation system's transmission of a second vector calibration signal with a crossed connection configuration between the two outputs of the signal generation system and the two inputs of the signal digitizing system.

In some embodiments, the digital filter includes only one inline filter and only one cross filter, wherein the inline filter and cross filter are configured so that only one of the following conditions hold:

(a) the inline filter is applied to the second signal input path and the cross filter crosses from the first signal input path to the second signal input path;

(b) the inline filter is applied to the second signal input path and the cross filter crosses from the second signal input path to the first signal input path;

(c) the inline filter is applied to the first signal input path and the cross filter crosses from the first signal input path to the second signal input path;

(d) the inline filter is applied to the first signal input path and the cross filter crosses from the second signal input path to the first signal input path.

In one set of embodiments, an imperfect baseband receiver and an imperfect baseband transmitter may be used to calibrate each other. If the imperfect receiver and transmitter are simply connected together, then it may be impossible to separate the impairments of the receiver from those of the transmitter. By also taking another measurement with the cables swapped (i.e., with TxI connected to RxQ and TxQ connected to RxI), it is then possible to separate the receiver impairments from the transmitter impairments. This is possible even in the presence of certain types of crosstalk. While it will not measure the absolute crosstalk, it can measure the relative crosstalk. In the case of effective images at RF, relative crosstalk compensation is all that is required in addition to the matched amplitude and phase responses.

BRIEF DESCRIPTION OF THE DRAWINGS

A better understanding of the present inventions can be obtained when the following detailed description is considered in conjunction with the following drawings.

FIG. 1 illustrates one embodiment of a method for determining gain and/or phase imbalance of a signal generation system and/or a signal digitizing system.

FIG. 2 illustrates one embodiment of a method for correcting baseband gain and/or phase imbalance impairments in a signal generation system.

FIG. 2B illustrates one embodiment of a signal generation system, including a digital circuit followed by a digital-to-analog conversion unit.

FIG. 3 illustrates one embodiment of a method for correcting baseband I/Q gain and/or phase imbalance impairments in a signal digitizing system.

FIG. 3B illustrates one embodiment of the signal digitization system, including a digitization unit followed by a digital circuit.

FIG. 14 replicates equations 7.10 through 7.14 from the specification, for the reader's convenience.

Figure 1B:
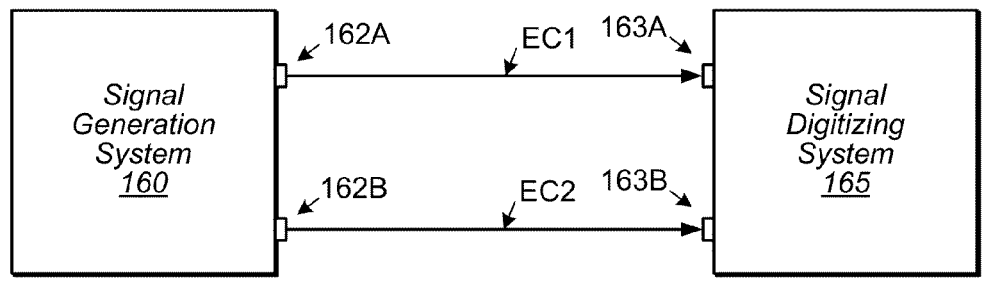
FIGS. 1B, 1C and 1D illustrate three possible connection configurations between the signal generation system 160 and the signal digitizing system 165.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note that the various section headings in the following Detailed Description are for organizational purposes only and are not meant to be used to limit the claims.

DETAILED DESCRIPTION OF THE EMBODIMENTS

Incorporation by Reference

U.S. patent application Ser. No. 13/404,851, filed Feb. 24, 2012, entitled "Mechanisms for the Correction of I/Q Impairments", invented by Stephen L Dark and Daniel J. Baker, is hereby incorporated by reference in its entirety as though fully and completely set forth herein.

Terminology

The following is a glossary of terms used in the present application.

Memory medium—A memory medium is a non-transitory medium configured for the storage and retrieval of information. Examples of memory media include: various kinds of semiconductor-based memory such as RAM and ROM (including static RAM and dynamic RAM of various kinds, and PROM, EPROM, EEPROM and flash memory of various kinds); various kinds of magnetic media such as magnetic disk, tape, strip and film; various kinds of optical media such as CD-ROM, DVD-ROM and holographic media; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. A memory medium is typically computer-readable, e.g., is capable of being read by a computer.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a tablet computer, a wearable computer, etc.

In some embodiments, a set of computers distributed across a network may be configured to partition the effort of executing a computational method (e.g., any of the method embodiments disclosed herein).

In one set of embodiments, a method 100 for determining gain and/or phase imbalance of a signal generation system and/or a signal digitizing system may include the operations shown in FIG. 1. (The method 100 may also include any subset of the features, elements and embodiments described below in connection with FIGS. 4-15.) The signal generation system may include one or more waveform generators. Similarly, the signal digitizing system may include one or more waveform generators.

At 110, after a first output and a second output of the signal generation system has been connected respectively to a first input and a second input of the signal digitizing system using respectively a first electrical conductor and a second electrical conductor, the method includes (1) directing the signal generation system to generate a first vector calibration signal and to transmit a first vector output signal via the first output and the second output based on the first vector calibration signal, and (2) directing the signal digitizing system to capture a first set of vector samples from the first input and second input in response to the transmission of the first vector output signal. (The qualifier "vector" as used in the terms "vector sample" or "vector signal" implies that the sample or signal is being interpreted as a complex-valued sample or signal, having an I component and a Q component.) Each of the vector samples includes a corresponding sample of the first input and a corresponding sample of the second input.

At 115, after the first output and the second output of the signal generation system have been connected respectively to the second input and the first input of the signal digitizing system using the first and second electrical conductors, the method includes (3) directing the signal generation system to generate a second vector calibration signal and transmit a second vector output signal based on the second vector calibration signal, and (4) directing the signal digitizing system to capture a second set of vector samples from the first input and second input in response to the transmission of the second vector output signal. Again, each of the vector samples includes a corresponding sample of the first input and a corresponding sample of the second input.

At 120, the method includes computing a measurement of gain and/or phase imbalance of the signal generation system and/or a measurement of gain and/or phase imbalance of the signal digitizing system based on input data including the first set of vector samples and the second set of vector samples, e.g., as variously described below.

FIG. 1B illustrates an initial connection configuration between the signal generation system 160 and signal digitizing system 165, where the first output 162A is connected to the first input 163A via the first electrical conductor EC1, and the second output 162B is connected to the second input 163B via the second electrical conductor EC2. This initial connection configuration may be used to perform the acquisition operation 110.

Figure 1C:
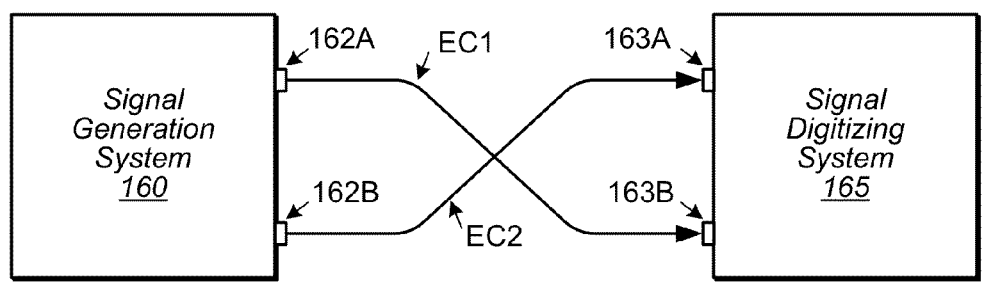

FIG. 1C illustrates a second connection configuration between the signal generation system 160 and signal digitizing system 165, wherein the first output 162A is connected to the second input 163B via the first electrical conductor EC1, and the second output 162B is connected to the first input 163A via the second electrical conductor EC2. This second connection configuration may be used perform the acquisition operation 115, e.g., especially when the impairment(s) of the signal digitizing system are being determined.

Figure 1D:
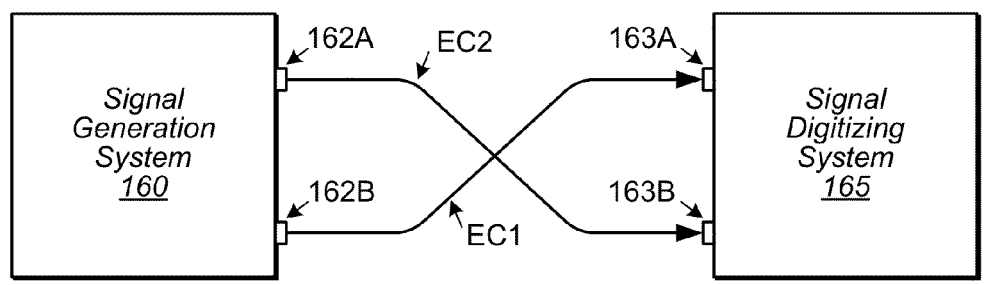

FIG. 1D illustrates a third connection configuration between the signal generation system 160 and signal digitizing system 165, wherein the first output 162A is connected to the second input 163B via the second electrical conductor EC2, and the second output 162B is connected to the first input 163A via the first electrical conductor EC1. This third connection configuration may be used perform the acquisition operation 115, e.g., especially when the impairment(s) of the signal generation system are being determined.

In some embodiments, the signal generation system includes a single dual-channel waveform generator.

In some embodiments, the signal generation system includes two single-channel waveform generators.

In some embodiments, the signal digitizing system includes a single dual-channel waveform digitizer.

In some embodiments, the signal digitizing system includes two single-channel waveform digitizers.

In some embodiments, the first vector calibration signal and the second vector calibration signal are identical, e.g., as variously described below. In other embodiments, the first vector calibration signal and the second vector calibration signal are different, e.g., as variously described below.

In some embodiments, the signal generation system is a waveform generator, where the first and second outputs are respectively I and Q outputs of the waveform generator. A waveform generator is a device that is configured to generate signals based on a specified sequence of samples. For example, a user-defined program may supply the sequence of samples to the waveform generator, and/or, may supply a set of parameters defining the sequence of samples. (In some embodiments, the waveform generator is a baseband waveform generator, wherein the I and Q outputs are baseband outputs. The waveform generator may also include circuitry to convert the I and Q baseband outputs into an RF output signal.) Waveform generators are available from any of a wide variety of manufacturers and suppliers. For example, National Instruments Corp. produces waveform generators such as NI PXI-5421, NI PXIe-5442, NI PXIe-5450, NI PXIe-5451, NI PXIe-5645R.

In some embodiments, the signal digitizing system is a waveform digitizer, where the first and second inputs are respectively I and Q inputs of the waveform digitizer. A waveform digitizer is a device that is configured to convert a baseband IQ signal comprising I and Q component signals into a sequence of vector samples. The sequence of vector samples are stored in memory and made available to other devices for any desired analysis or processing. Waveform digitizers are available from any of a wide variety of manufacturers and suppliers. For example, National Instruments Corp. produces waveform digitizers such as NI PXI-5122, NI PXI-5124, NI PXIe-5162, NI PXIe-5185, NI PXIe-5645R.

In some embodiments, the gain and/or phase imbalance of the signal generation system includes a magnitude imbalance (i.e., gain imbalance) and a phase imbalance (i.e., phase skew) between I and Q channels of the waveform generator.

In some embodiments, the gain and/or phase imbalance of the signal digitizing system includes a magnitude imbalance (i.e., gain imbalance) and phase imbalance (i.e., phase skew) between I and Q channels of the waveform digitizer.

In some embodiments, the method 100 may also include storing the measurement of gain and/or phase imbalance of the signal generation system and/or the measurement of gain and/or phase imbalance of the signal digitizing system in a memory.

In some embodiments, the method 100 may also include correcting the phase and/or gain imbalance of the signal generation system using the measurement of the phase and/or gain imbalance of the signal generation system.

In some embodiments, the action of correcting the phase and/or gain imbalance of the signal generation system includes programming a programmable hardware element (such as an FPGA) in the signal generation system to implement a correction filter, wherein coefficients of the filter are determined from the measurement of the gain and phase imbalance of the signal generation system. The programmable hardware element may be configured to operate on digital baseband signals (e.g., I and Q signals) prior to digital-to-analog conversion within the signal generation system.

In some embodiments, the method 100 may also include correcting the phase and/or gain imbalance of the signal digitizing system using the measurement of the gain and/or phase imbalance of the signal digitizing system.

In some embodiments, the action of correcting the phase and/or gain imbalance of the signal digitizing system includes programming a programmable hardware element (such as an FPGA) in the signal digitizing system to implement a correction filter, where coefficients of the correction filter are determined from the measurement of the gain and/or phase imbalance of the signal digitizing system. The programmable hardware element may be configured to operate on the digital baseband signals (e.g., I and Q signals) supplied by the analog-to-digital conversion circuitry of the signal digitizing system.

In some embodiments, the action of connecting the first output and the second output of the signal generation system respectively to the second input and the first input of the signal digitizing system includes: (a) connecting the first electrical conductor from the first output of the signal generation system to the second input of the signal digitizing system; and (b) connecting the second electrical conductor from the second output of the signal generation system to the first input of the signal digitizing system. For example, between operations 110 and 115 a user or an automated system may disconnect the first and second electrical conductors from the first and second inputs (while maintaining their connections to the first and second outputs), and then reconnect to the first and second inputs with swapped correspondence of conductors to inputs.

Alternatively, the action of connecting the first output and the second output of the signal generation system respectively to the second input and the first input of the signal digitizing system includes: (a*) connecting the first electrical conductor from the second output of the signal generation system to the first input of the signal digitizing system; and (b*) connecting the second electrical conductor from the first output of the signal generation system to the second input of the signal digitizing system. For example, between operations 110 and 115 a user or an automated system may disconnect the first and second electronical conductors from the first and second outputs (while maintaining their connections to the first and second inputs), and then reconnect to the first and second outputs with swapped correspondence of conductors to outputs.

In some embodiments, the first electrical conductor and the second electrical conductor are electrical cables.

In some embodiments, the first electrical conductor and the second electrical conductor are traces on a circuit board or conductive paths in an integrated circuit.

In some embodiments, the signal generation system is a baseband I/Q waveform generator, and, the waveform digitizing system is a baseband I/Q waveform digitizer.

In some embodiments, the first vector calibration signal and/or the second vector calibration signal includes intentionally-introduced gain and phase impairments to facilitate more accurate estimation of the gain and/or phase imbalance of the signal generation system and/or the signal digitizing system.

In some embodiments, the first vector calibration signal and/or the second vector calibration signal includes a complex exponential signal that is swept or stepped through a desired range of frequencies.

In one set of embodiments, a computer system for determining gain and/or phase imbalance of a signal generation system and/or a signal digitizing system may be configured as follows. (The computer system may also include any subset of the features, elements and embodiments described above and described below in connection with FIGS. 4-15.) The signal generation system includes a first output and a second output, and the signal digitizing system includes a first input and a second input.

The computer system includes a processor and memory. The memory stores program instructions, where the program instructions, when executed by the processor, cause the processor to implement the following operations.

In response to a first signal indicating that a first connection configuration has been achieved between the first and second outputs of the signal generation system and the first and second inputs of the signal digitizing system, the processor (a) directs the signal generation system to generate a first vector calibration signal and transmit a first vector output signal via the first and second outputs based on the first vector calibration signal, and (b) directs the signal digitizing system to capture a first set of vector samples from the first input and second input in response to the transmission of the first vector output signal. The first connection configuration includes a connection of a first electrical conductor between the first output and the first input, and a connection of a second electrical conductor between the second output and the second.

In response to a second signal indicating that a second connection configuration has been achieved between the first and second outputs of the signal generation system and the first and second inputs of the signal digitizing system, the processor (c) directs the signal generation system to generate a second vector calibration signal and transmit a second vector output signal via the first and second outputs based on the second vector calibration signal, and (d) directs the signal digitizing system to capture a second set of vector samples from the first input and second input in response to the transmission of the second vector output signal. The second connection configuration includes the first and second electrical conductors being configured so that the first output is connected to the second input, and second output is connected to the first input.

The processor may compute a measurement of gain and/or phase imbalance of the signal generation system and/or a measurement of gain and/or phase imbalance of the signal digitizing system based on input data including the first set of vector samples and the second set of vector samples, e.g., as variously described below. (See especially the mathematical discussions below.)

In some embodiments, the first vector calibration signal and the second vector calibration signal are identical. In other embodiments, the first vector calibration signal and the second vector calibration signal are different.

In some embodiments, the computer system may also include an automated system configured to connect and disconnect the first and second electrical conductors from the first and second outputs of the signal generation system and the first and second inputs of the signal digitizing system in order to achieve the first connection configuration or the second connection configuration upon command from the processor. The automated system may be employed to support measurements on a series of signal generation systems and/or a series of signal digitizing systems, e.g., in a factory calibration environment.

In one set of embodiments, a computer system for determining gain and/or phase imbalance of a signal generation system and/or a signal digitizing system may be configured as follows. (The computer system may also include any subset of the features, elements and embodiments described above and described below in connection with FIGS. 4-15.) The signal generation system includes a first output and a second output, and the signal digitizing system includes a first input and a second input.

The computer system includes a processor and memory. The memory stores program instructions, wherein the program instructions, when executed by the processor, cause the processor to perform the following operations.

In response to a first indication indicating that a first connection configuration has been achieved between the first and second outputs of the signal generation system and the first and second inputs of the signal digitizing system, the processor (a) directs the signal generation system to generate a first vector calibration signal and transmit a first vector output signal via the first and second outputs based on the first vector calibration signal, and (b) directs the signal digitizing system to capture a first set of vector samples in response to the transmission of the first vector output signal. The first connection configuration includes an electrical connection between the first output and the first input, and an electrical connection between the second output and the second input.

In response to a second indication indicating that a second connection configuration has been achieved between the first and second outputs of the signal generation system and the first and second inputs of the signal digitizing system, the processor (c) directs the signal generation system to generate a second vector calibration signal and transmit the second vector output signal via the first and second outputs based on the second vector calibration signal, and (d) directs the signal digitizing system to capture a second set of vector samples in response to the transmission of the second vector calibration signal, wherein the second connection configuration includes an electrical connection between the first output and the second input, and an electrical connection between the second output and the first input.

The processor may compute a measurement of gain and/or phase imbalance of the signal generation system and/or a measurement of gain and/or phase imbalance of the signal digitizing system based on input data including the first set and the second set of vector samples.

In some embodiments, the first vector calibration signal and the second vector calibration signal are identical. In other embodiments, the first vector calibration signal and the second vector calibration signal are different.

In some embodiments, an electronic switching device is coupled to the first and second outputs of the signal generation system and the first and second inputs of the signal digitizing system. The electronic switching device is configured to establish the first connection configuration or the second connection configuration upon command from the processor.

In some embodiments, the signal generation system and the signal digitizing system are incorporated in a common enclosure with the electronic switching device.

In some embodiments, the electronic switching device includes one or more relays.

In one set of embodiments, a method 200 for correcting baseband gain and/or phase imbalance impairments in a signal generation system may include the operations shown in FIG. 2. (The method 200 may also include any subset of the features, elements and embodiments described above.) The gain and phase imbalance impairments may be impairments between a first signal output path and a second signal output path of the signal generation system.

At 210, the method may include programming a digital correction circuit in the signal generation system to implement a digital filter. The digital correction circuit is configured at a location upstream from digital-to-analog conversion in the signal generation system. The digital filter includes at least one inline filter and at least one cross filter. Each inline filter is applied to either the first signal output path or the second signal output path. (In other words, each inline filter is inline with either the first signal output path or the second signal output path.) Each cross filter crosses from the first signal output path to the second signal output path or vice versa. The parameters of said at least one inline filter and parameters of said at least one cross filter have been determined based on: (1) a first set of vector samples captured by a signal digitizing system in response to the signal generation system's transmission of a first vector calibration signal with a first connection configuration between two outputs of the signal generation system and two inputs of the signal digitizing system; and (2) a second set of vector samples captured by the signal digitizing system in response to the signal generation system's transmission of a second vector calibration signal with a crossed connection configuration between the two outputs of the signal generation system and the two inputs of the signal digitizing system. Methods for computing the parameters based on the first and second sets of vector samples are described variously above and below.

In some embodiments, the method 200 may also include invoking an operational mode of the signal generation system after having programmed the digital correction circuit. In the operational mode, the signal generation system may generate corrected signals at its two outputs by virtue of the correcting action of the digital correction circuit. The corrected signals may be used, e.g., to test a receiver. The corrected signals may be transmitted to a receiver under test. The receiver may be evaluated or measured based on the signals it captures in response to the transmission of the corrected signals.

In some embodiments, the digital correction circuit is a programmable hardware element (PHE) or a dedicated digital circuit such as an ASIC. In other embodiments, the digital correction circuit is a processor configured to operate under the control of stored program instructions.

In some embodiments, the signal generation system is a waveform generator, where the first signal output path is an I channel of the waveform generator, and the second signal output path is a Q channel of the waveform generator.

In some embodiments, the digital filter includes only one inline filter and only one cross filter, wherein the inline filter and cross filter are configured so that only one of the following conditions hold:

(a) the inline filter is applied to the second signal output path and the cross filter crosses from the first signal output path to the second signal output path;

(b) the inline filter is applied to the second signal output path and the cross filter crosses from the second signal output path to the first signal output path;

(c) the inline filter is applied to the first signal output path and the cross filter crosses from the first signal output path to the second signal output path;

(d) the inline filter is applied to the first signal output path and the cross filter crosses from the second signal output path to the second signal output path.

In some embodiments, the cross filter compensates for unmatched cross talk between the channels, and the inline filter compensates for the gain and/or phase imbalance between the first signal output path and the second signal output path.

In some embodiments, the cross filter is identically zero, and the inline filter compensates for the gain and/or phase imbalance between the first signal output path and the second signal output path.

In some embodiments, the digital filter includes only the at least one inline filter and no cross filters.

FIG. 2B illustrates an embodiment 250 of the signal generation system, including a digital circuit 255, a digital-to-analog conversion unit 257. The digital circuit 255 implements the above-described impairment correction(s) when programmed by the above-described method 200. The digital circuit 255 receives inphase digital signal I(n) and quadrature digital signal Q(n), and generates filtered inphase digital signal $I_F(n)$ and filtered quadrature digital signal $Q_F(n)$. The DAC unit 257 generates inphase analog signal I(t) and quadrature analog signal Q(t) based on the filtered signals $I_F(n)$ and $Q_F(n)$.

In one set of embodiments, a method 300 for correcting baseband I/Q gain and/or phase imbalance impairments in a signal digitizing system may include the operations shown in FIG. 3. (The computer system may also include any subset of the features, elements and embodiments described above and described below in connection with FIGS. 4-15.) The baseband I/Q gain and/or phase imbalance impairments may be impairments between a first signal input path and a second signal input path of the signal digitizing system.

At 310, the method includes programming a digital correction circuit in the signal digitizing system to implement a digital filter. The digital correction circuit is configured at a location downstream from analog-to-digital conversion in the signal digitizing system. The digital filter includes at least one inline filter and at least one cross filter. Each inline filter is applied to either the first signal input path or the second signal input path. (In other words, each inline filter is inline with either the first signal input path or the second signal input path.) Each cross filter crosses from the first signal input path to the second signal input path or vice versa. The parameters of said at least one inline filter and parameters of said at least one cross filter have been determined based on: (1) a first set of vector samples captured by the signal digitizing system in response to a transmission of a first vector calibration signal by a signal generation system with a first connection configuration between two outputs of the signal generation system and two inputs of the signal digitizing system; and (2) a second set of vector samples captured by the signal digitizing system in response to the signal generation system's transmission of a second vector calibration signal with a crossed connection configuration between the two outputs of the signal generation system and the two inputs of the signal digitizing system. Methods for determining the parameters of the filters based on the first and second vector samples sets are variously described above and below. See especially the mathematical discussions below.

In some embodiments, the method 300 may also include invoking an operational mode of the signal digitizing system after having programmed the digital correction circuit. In the operational mode, the signal digitizing system may generate corrected digital signals at the outputs of the digital correction circuit (by virtue of the correcting action of the digital correction circuit). The signal digitizing system may be used, e.g., to test a transmitter. The transmitter under test may transmit signals to the signal digitizing system. The corrected signals generated by the digital correction circuit in response to the transmission may be used to evaluate or measure the transmitter under test.

In some embodiments, the digital correction circuit is a programmable hardware element (PHE) or a dedicated digital circuit such as an ASIC. In other embodiments, the digital correction circuit is a processor configured to operate under the control of stored program instructions.

In some embodiments, the signal digitizing system is a waveform digitizer, where the first signal input path is an I channel of the waveform digitizer, and the second signal input path is a Q channel of the waveform digitizer.

In some embodiments, the digital filter includes only one inline filter and only one cross filter, where the inline filter and cross filter are configured so that only one of the following conditions hold:

(a) the inline filter is applied to the second signal input path and the cross filter crosses from the first signal input path to the second signal input path;

(b) the inline filter is applied to the second signal input path and the cross filter crosses from the second signal input path to the first signal input path;

(c) the inline filter is applied to the first signal input path and the cross filter crosses from the first signal input path to the second signal input path;

(d) the inline filter is applied to the first signal input path and the cross filter crosses from the second signal input path to the first signal input path.

In some embodiments, the cross filter compensates for unmatched cross talk between the first and second input paths, and the inline filter compensates for the gain and/or phase impairments between the first signal input path and the second signal input path.

In some embodiments, the cross filter is identically zero, and the inline filter compensates for the gain and/or phase impairments between the first signal input path and the second signal input path.

In some embodiments, the digital filter includes only the at least one inline filter and no cross filters.

FIG. 3B illustrates one embodiment 350 of a signal digitizing system, including a digitization unit 355 and a digital circuit 360. The digitization unit 355 receives inphase analog signal I(t) and quadrature analog signal Q(t), and generates inphase digital signal I(n) and quadrature digital signal Q(n). The digital circuit 360 filters the digital signal I(n) and Q(n) to produce filtered signals $I_F(n)$ and $Q_F(n)$, e.g., as variously described above and below.

Separating RX and TX Impairments at Baseband

This section describes how to measure RX and TX impairments for baseband IQ inputs and outputs. When measuring the impairments for RF, all that is required is information content at the desired frequency offset and no power content at the image frequency. In the case of a direct conversion receiver, a calibration tone supplied by a calibration synthesizer can used to determine the impairments. In the case of a direct conversion transmitter, the transmitter will attempt to generate a pure tone, and an IF receiver can be used to measure the impairments. In both cases, it is important that the calibrating device have some way to distinguish its impairments from the DUTs.

In the case of baseband calibration, this same technique can be very difficult. First, a perfect complex tone (complex exponential tone/single sideband tone) cannot be created since the center frequency for baseband is 0 Hz. As a result, measuring gain imbalance and phase skew impairments relates directly back to the gain imbalance and phase skew of the calibrating device. While most baseband arbitrary waveform generators and digitizers specify their absolute gain accuracy and possibly relative channel-to-channel gain accuracy and channel-to-channel skew, most will not specify their phase response. In addition, most of these specifications are far looser than is needed to calibrate image rejection to levels better −50 dB. For example, a gain difference between the two channels of 0.05 dB results in an image at −50 dB. In addition, a group delay difference between the I and Q channels of 25 ps will also result in a −50 dB image at 40 MHz.

Since gain imbalance and phase skew impairments are relative values, it is possible to determine them on a baseband transceiver by looping back the generators I/Q signals into the receiver. This results in measurements at the receiver that gives the combined transmitter and receiver impairments. Now the impairments need to be separated into those resulting in the transmitters signal path and the those resulting from the transmitter signal path. This can be accomplished by crossing the cables, i.e., $$I_{TX} => Q_{RX} \text{ and } Q_{TX} => I_{RX},$$

and obtaining a different combined measurement and then performing a numerical calculation. The rest of this section describes the theory behind this calculation where the final equations for separating these two measurements into impairments for the transmitter and impairments for the receiver is given at the end.

Figure 4:
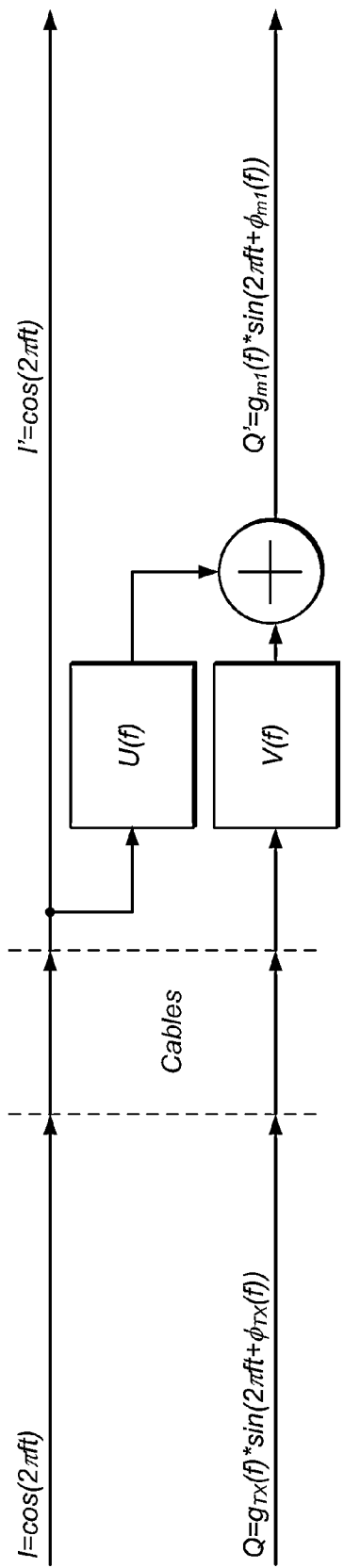
FIG. 4 illustrates one embodiment of an inline measurement configuration where the inline gain imbalance is given by $g_{m1}(f)$ and the phase skew is $\phi_{m1}(f)$.

FIG. 4 shows the setup for the "inline" measurement where the inline gain imbalance is given by $g_{m1}(f)$ and the phase skew is $\phi_{m1}(f)$. In this case, the cables are looped back into the transmitter such that $$I_{TX} => I_{RX} \text{ and } Q_{TX} => Q_{RX}.$$

Figure 5:
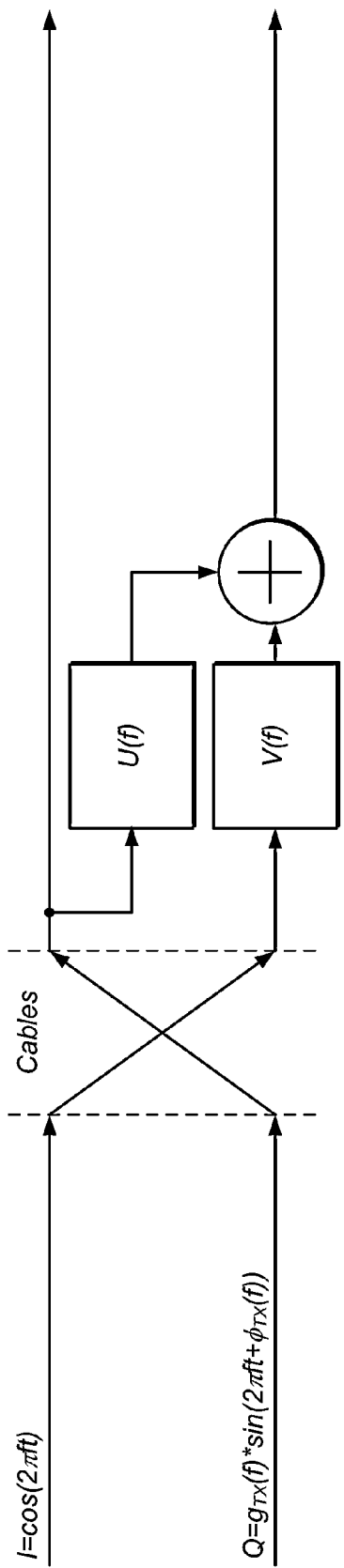
FIG. 5 illustrates one embodiment of a crossed measurement configuration.

FIG. 5 shows the setup for making a "crossed" measurement. This results when $I_{TX}$ is connected to $Q_{RX}$ and $Q_{TX}$ is connected to $I_{RX}$. In order to understand this system, the inputs need to first be related to the relative impairments that will be measured at the output. By crossing the I and Q channels, the impairments seen at the input to the receiver will be flipped in frequency such that a complex exponential tone produced at the transmitter at frequency f, will appear at the receivers inputs at −f. In addition, the convention adopted throughout this document places all impairments on the Q channel where the I channel is assumed perfect. Equations 5.1 thru 5.7 give the step-by-step transformation back to the standard convention. While this transformation changes the absolute values of the measurement, the relative values between the I and Q channels are unaffected and thus the measurement of the impairments do not change. Starting in equation 5.1 are the inputs of the receiver from FIG. 5. Notice that I(t,−f) and Q(t,−f) are defined at negative frequency as this is the convention of the measurement made at the output of the receiver.

$$I(t,-f) = g_{TX}(f)\sin(2\pi ft + \Phi_{TX}(f))$$

$$Q(t,-f) = \cos(2\pi ft)$$

$$I(t,-f) = \sin(2\pi ft) \quad (5.1)$$

$$Q(t, -f) = \frac{1}{g_{TX}(f)}\cos(2\pi ft - \Phi_{TX}(f)) \quad (5.2)$$

$$I(t,-f) = \cos\left(2\pi ft - \frac{\pi}{2}\right)$$

$$Q(t,-f) = \frac{1}{g_{TX}(f)}\sin\left(2\pi ft - \Phi_{TX}(f) + \frac{\pi}{2}\right) \quad (5.3)$$

$$I(t,-f) = \cos(2\pi ft)$$

$$Q(t,-f) = \frac{1}{g_{TX}(f)}\sin(2\pi ft - \Phi_{TX}(f) + \pi) \quad (5.4)$$

$$I(t,-f) = \cos(2\pi ft)$$

$$Q(t,-f) = \frac{-1}{g_{TX}(f)}\sin(2\pi ft - \Phi_{TX}(f)) \quad (5.5)$$

$$I(t,-f) = \cos(-2\pi ft)$$

$$Q(t,-f) = \frac{1}{g_{TX}(f)}\sin(-2\pi ft + \Phi_{TX}(f)) \quad (5.6)$$

$$I(t,f) = \cos(2\pi ft)$$

$$Q(t,f) = \frac{1}{g_{TX}(-f)}\sin(2\pi ft + \Phi_{TX}(-f)) \quad (5.7)$$

In order for everything to have the same sign of the measurement frequency, f is substituted for −f between equations 5.6 and 5.7.

Figure 6:
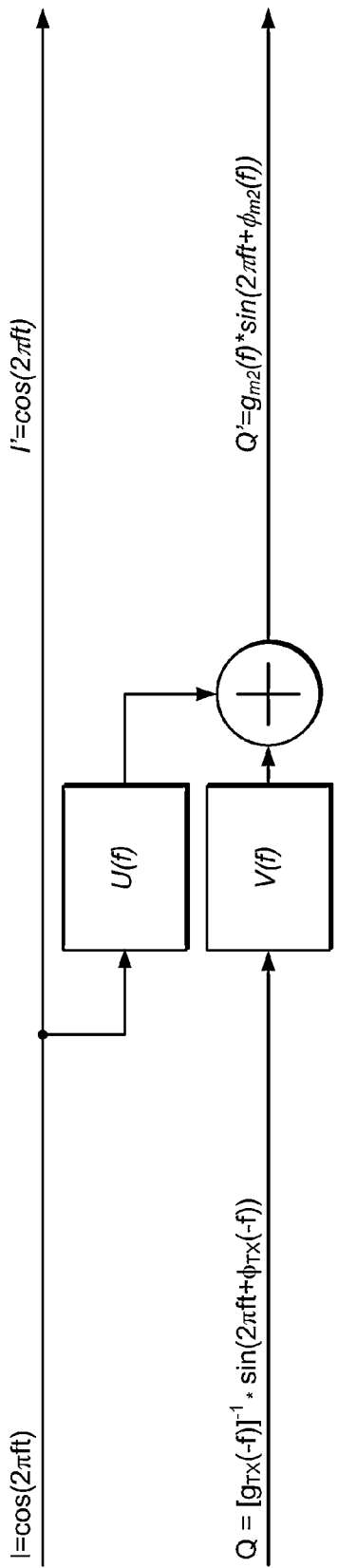
FIG. 6 illustrates one embodiment of an effective crossed measurement configuration.
Figure 7:
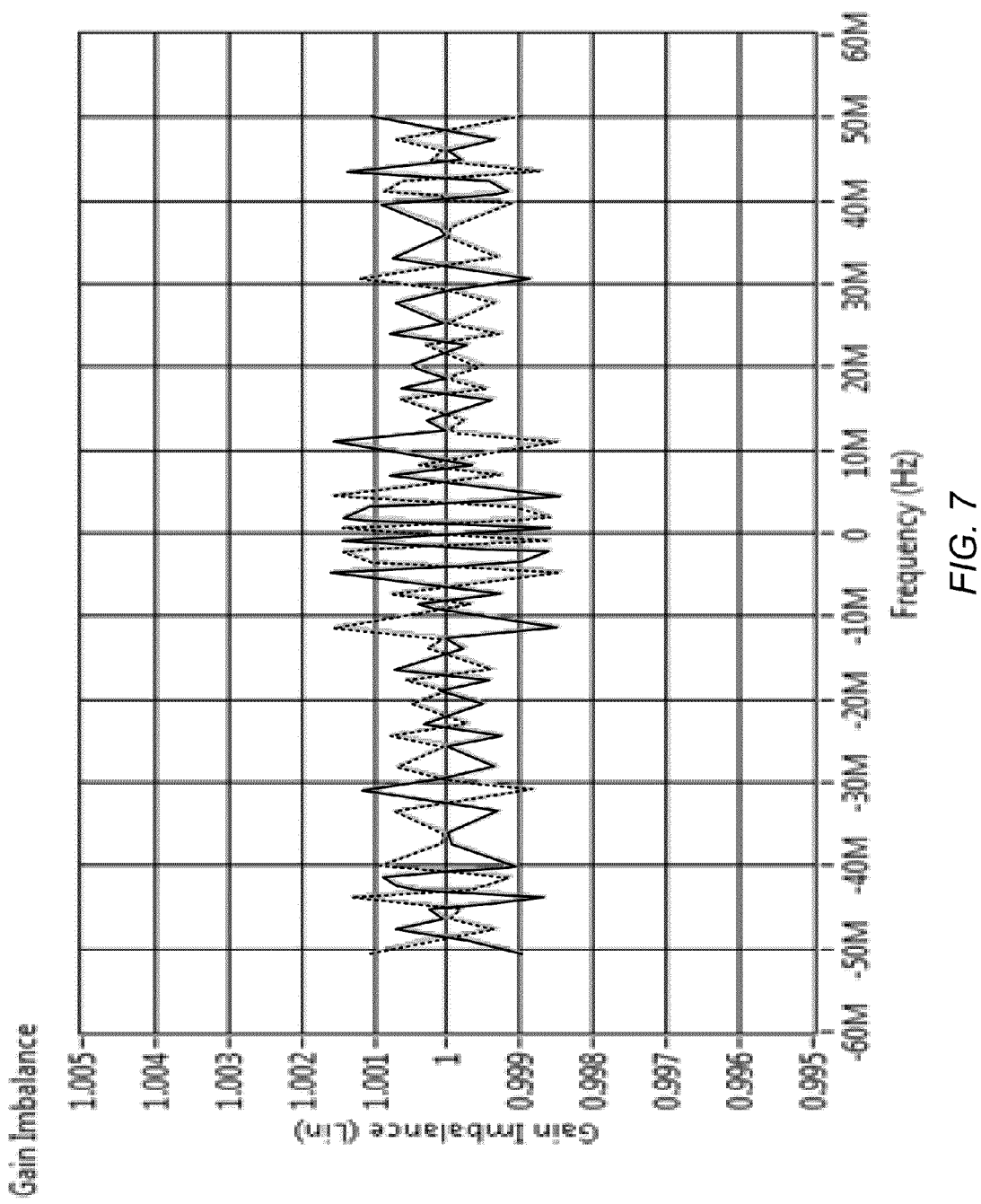
FIG. 7 illustrates noise performance for a general calculation (with the assumption of no cross terms), according to one embodiment.
Figure 8:
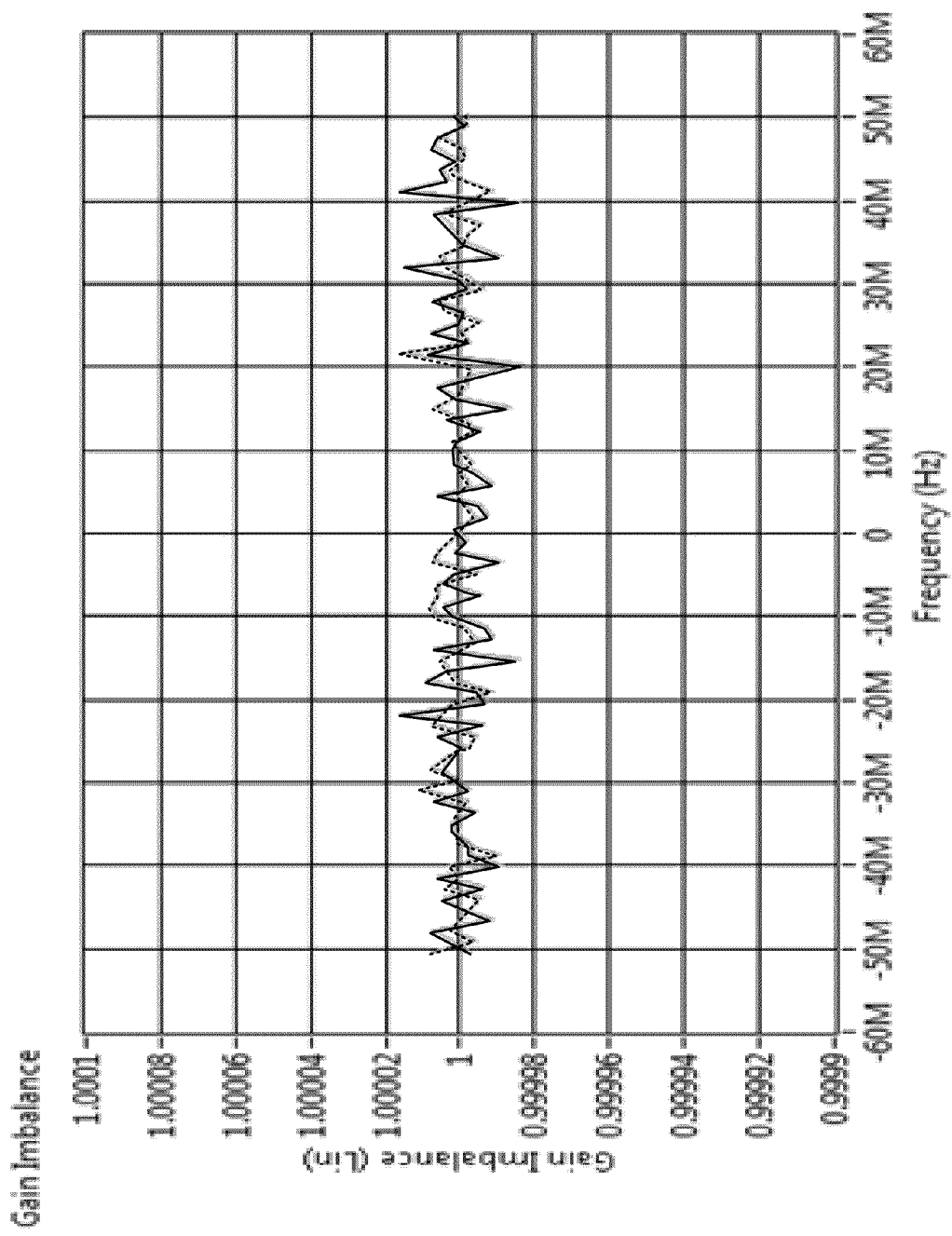
FIG. 8 illustrates noise performance assuming zero receiver cross term, according to one embodiment.
Figure 9:
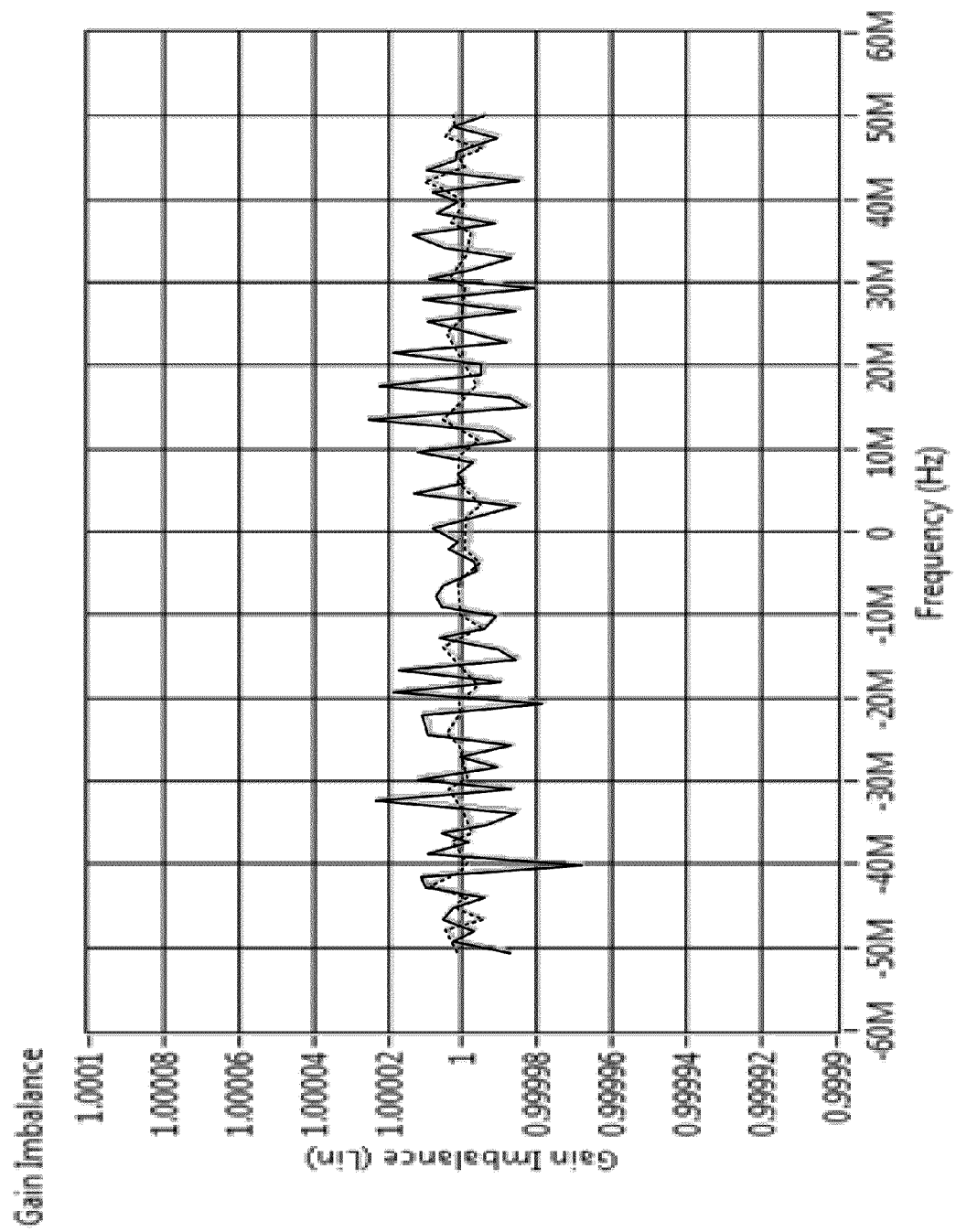
FIG. 9 illustrates noise performance assuming zero transmitter cross term, according to one embodiment.
Figure 10:
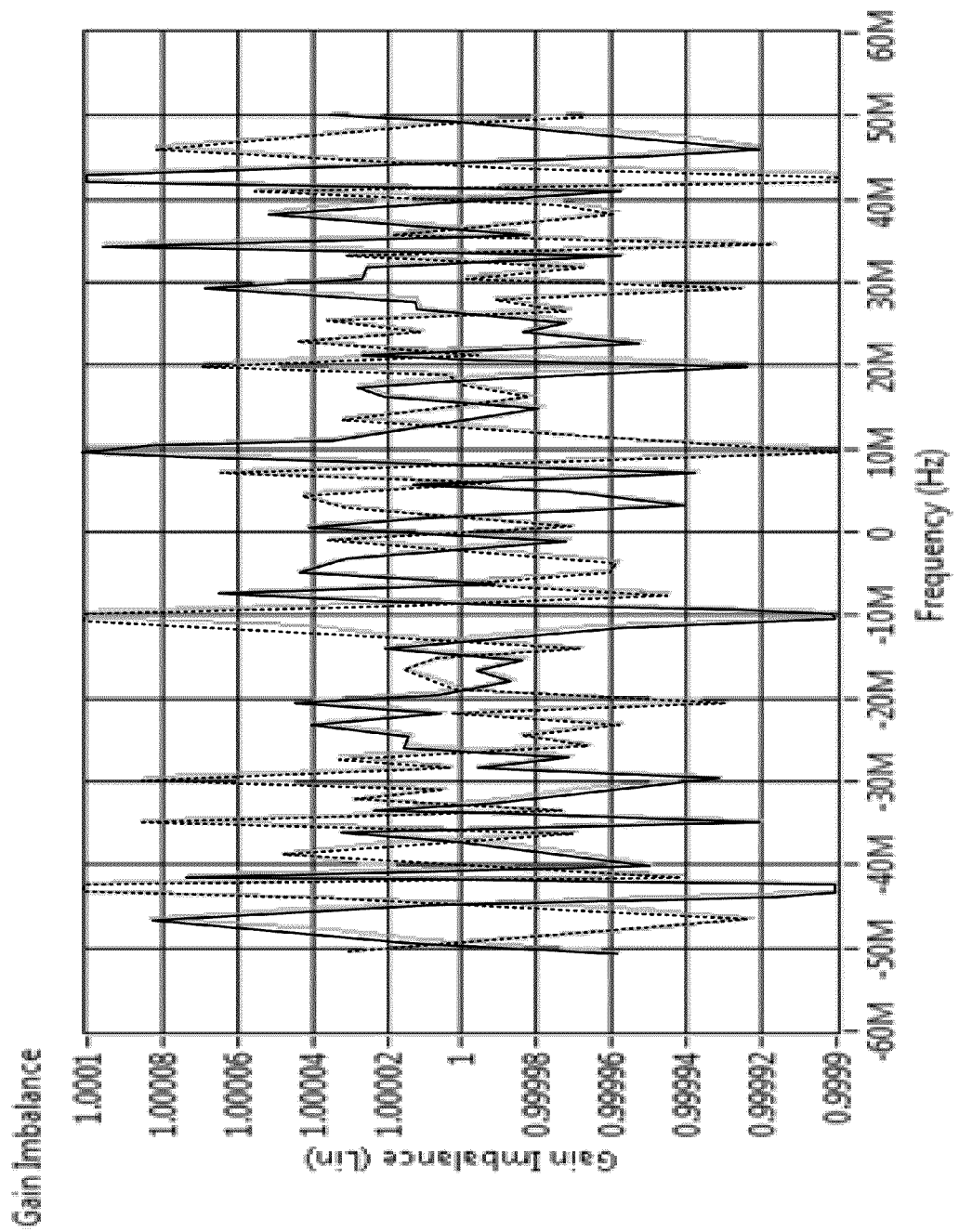
FIG. 10 illustrates noise performance with intentional gain imbalance at the transmitter equal to 0.95, according to one embodiment.
Figure 11:
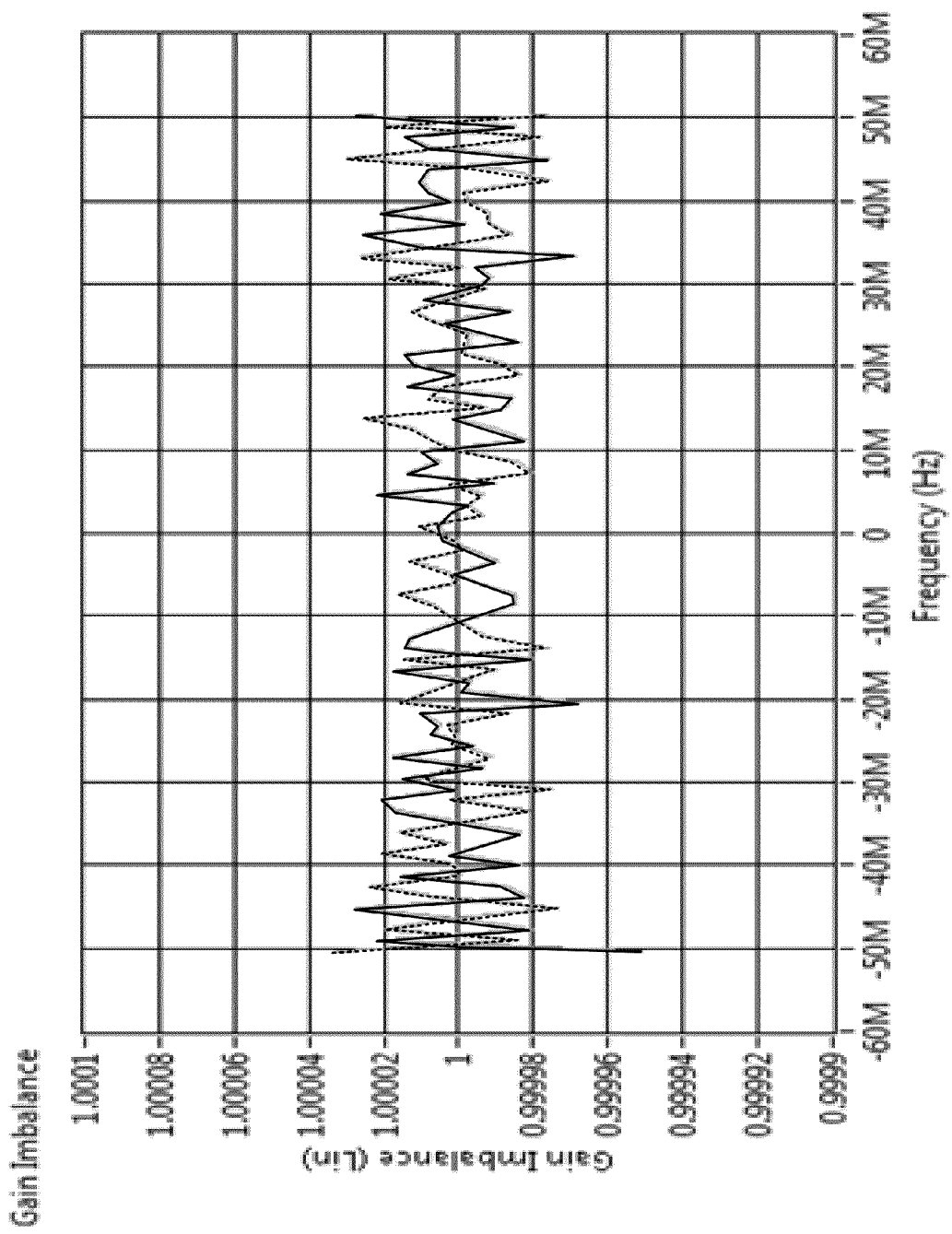
FIG. 11 illustrates noise performance with intentional gain imbalance at the transmitter equal to 0.8, according to one embodiment.
Figure 12:
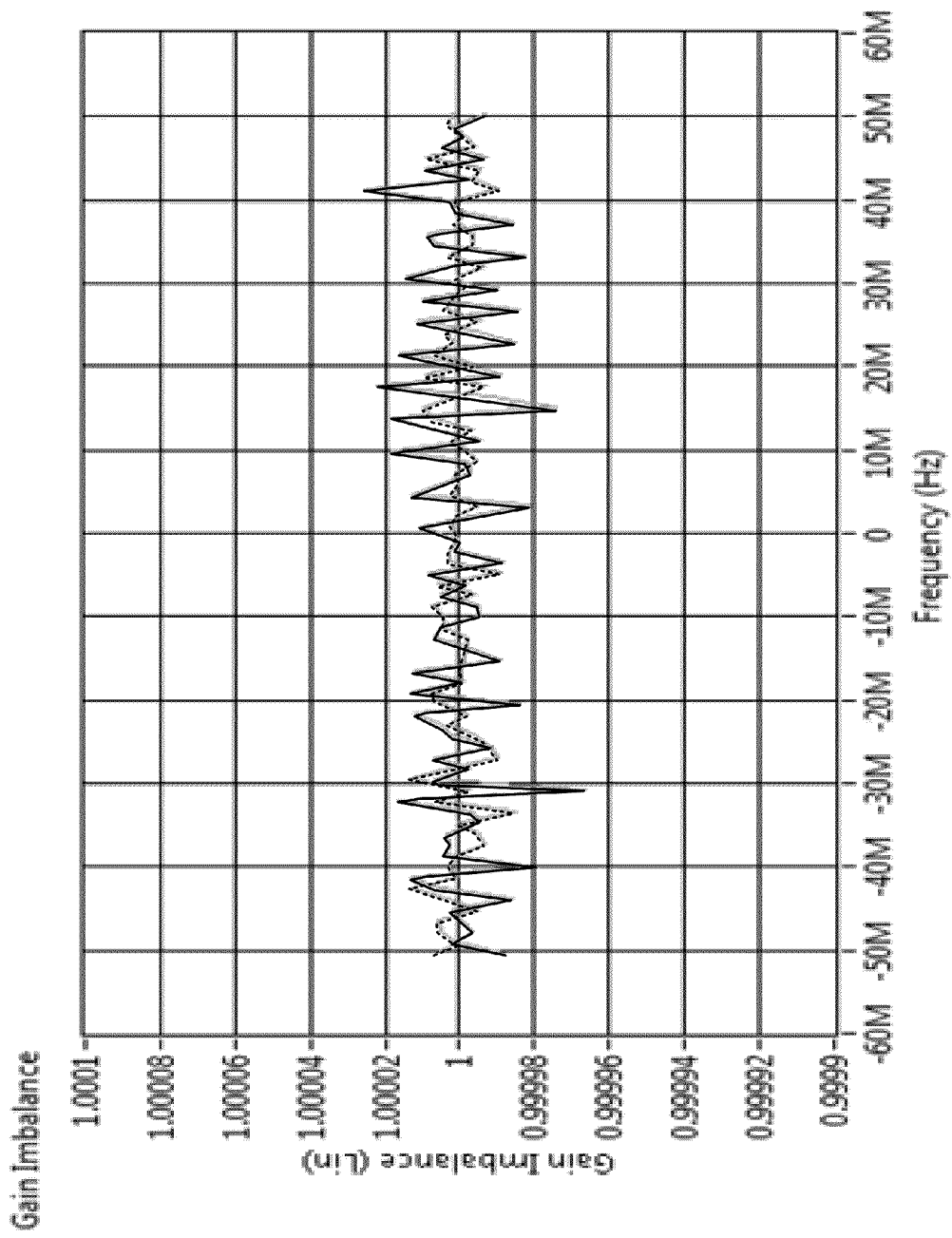
FIG. 12 illustrates noise performance with intentional gain imbalance at the transmitter equal to 0.5, according to one embodiment.

FIG. 6 shows the crossed setup where the crossed gain imbalance is given by $g_{m2}(f)$ and the crossed phase skew is $\phi_{m2}(f)$. While the inputs are not crossed in FIG. 6, the inputs are equal to the effective crossed inputs.

Equation 5.8 comes from equation 7.8 of the section entitled "Impairment Derivation". Equation 5.9 expresses the inline measurement using the setup in FIG. 4, and equation 5.10 expresses the crossed measurement using the setup in FIG. 6.

$$jU(f)+V(f)g_{in}(f)e^{j\phi_{in}(f)} = g_{out}(f)e^{j\phi_{out}(f)} \quad (5.8)$$

$$jU(f)+V(f)g_{TX}(f)e^{j\phi_{TX}(f)} = g_{m1}(f)e^{j\phi_{m1}(f)} \quad (5.9)$$

$$jU(f) + V(f)\frac{1}{g_{TX}(-f)}e^{j\phi_{TX}(-f)} = g_{m2}(f)e^{j\phi_{m2}(f)} \quad (5.10)$$

let $Z_{RX}(f) = g_{RX}(f)e^{j\phi_{RX}(f)}$ let $Z_{TX}(f) = g_{TX}(f)e^{j\phi_{TX}(f)}$ let $Z_{m1}(f) = g_{m1}(f)e^{j\phi_{m1}(f)}$ let $Z_{m2}(f) = g_{m2}(f)e^{j\phi_{m2}(f)}$ $$jU(f)+V(f)Z_{TX}(f) = Z_{m1}(f) \quad (5.11)$$

$$jU(f) + V(f)\frac{1}{Z^*_{TX}(-f)} = Z_{m2}(f) \quad (5.12)$$

If we assume zero cross terms on the receiver, meaning that U(f) is identically zero, then we can separate the impairments using equations 5.18 and 5.19. Since U(f) does not exists in this case, all of the impairments of the receiver are contained within V(f). In addition, since v(t) is defined to be real valued, V(f)=conj(V(−f)). Assuming U(f) is zero, equation 5.13 expresses the inline measurement using the setup in FIG. 4, and equation 5.14 expresses the crossed measurement using the setup in FIG. 6.

Since 5.14 is continuous and exists for all f, f is substituted for −f in equation 5.15. Since V(f)=conj(V(−f)), then $Z_{RX}(-f)$=conj($Z_{RX}(f)$) which leads to equation 5.16. Finally, conjugate the equation 5.16 to arrive at equation 5.17.

if $\forall f: U(f) = 0$, then $V(f) = g_{RX}(f)e^{j\phi_{RX}(f)}$ $$Z_{RX}(f)Z_{TX}(f) = Z_{m1}(f) \quad (5.13)$$

$$Z_{RX}(f)\frac{1}{Z^*_{TX}(-f)} = Z_{m2}(f) \quad (5.14)$$

$$Z_{RX}(-f)\frac{1}{Z^*_{TX}(f)} = Z_{m2}(-f) \quad (5.15)$$

$$Z^*_{RX}(f)\frac{1}{Z^*_{TX}(f)} = Z_{m2}(-f) \quad (5.16)$$

$$Z_{RX}(f)\frac{1}{Z_{TX}(f)} = Z^*_{m2}(-f) \quad (5.17)$$

By multiplying equations 5.13 and 5.17 we can recover the receiver's impairments by using equation 5.17. If equations 5.13 and 5.17 are divided, the transmitter's impairments can be determined from equation 5.19. From 5.18 and 5.19 we can either calculate the gain and phase of each equation to find the separated RX and TX gain imbalance and phase skew, or the gain imbalances and phase skews can be calculated from the direct gain imbalance and phase skew measurements shown in equations 5.20 through 5.23.

$$Z_{RX}(f) = \sqrt{Z_{m1}(f)Z^*_{m2}(-f)} \quad (5.18)$$

$$Z_{TX}(f) = \sqrt{\frac{Z_{m1}(f)}{Z^*_{m2}(-f)}} \quad (5.19)$$

$$g_{RX}(f) = \text{Mag}(Z_{RX}(f)) = \sqrt{g_{m1}(f)g_{m2}(f)} \quad (5.20)$$

$$\Phi_{RX}(f)=\text{Phase}(Z_{RX}(f))=\Phi_{m1}(f)-\Phi_{m2}(-f)/2 \quad (5.21)$$

$$g_{TX}(f) = Mag(Z_{TX}(f)) = \sqrt{\frac{g_{m1}(F)}{g_{m2}(-f)}} \quad (5.22)$$

$$\Phi_{TX}(f) = Phase(Z_{TX}(f)) = \frac{\Phi_{m1}(f) + \Phi_{m2}(-f)}{2} \quad (5.23)$$

If the transmitter also does not contain any cross terms, then $Z_{m1}(f)=\text{conj}(Z_{m1}(-f)$ and $Z_{m2}(f)=\text{conj}(Z_{m2}(-f))$. It then follows that the equations simplify to equations the following:

$$Z_{RX}(f)=\sqrt{Z_{m1}(f)Z_{m2}(f)} \quad (5.24)$$

$$Z_{TX}(f) = \sqrt{\frac{Z_{m1}(f)}{Z_{m2}(f)}} \quad (5.25)$$

$$g_{RX}(f)=\text{Mag}(Z_{RX}(f))=\sqrt{g_{m1}(f)g_{m2}(f)} \quad (5.26)$$

$$\Phi_{RX}(f)=\text{Phase}(Z_{RX}(f))=\Phi_{m1}(f)+\Phi_{m2}(f)/2 \quad (5.27)$$

$$g_{TX}(f) = Mag(Z_{TX}(f)) = \sqrt{\frac{g_{m1}(f)}{g_{m2}(f)}} \quad (5.28)$$

$$\Phi_{TX}(f)=\text{Phase}(Z_{TX}(f))=\Phi_{m1}(f)-\Phi_{m2}(f)/2 \quad (5.29)$$

The previous derivation made the assumption that the receiver contained zero cross terms by assuming that U(f) was identically zero. The following derivation does not make this assumption and is completely general and thus assumes nothing about the cross terms. Equation 5.30 and 5.31 are the result of the section entitled "Impairment Derivation". Equations 5.32 and 5.33 represent the looping back the transmitter into the receiver in the inline configuration shown in FIG. 4. As a result, $Z_{in}(f)=Z_{TX}(f)$ and $Z_{out}(f)=Z_{m1}(f)$. Equations 5.34 and 5.35 are the result of the measuring using loopback in the crossed configuration given in FIG. 6. Following from equation 5.7, $Z_{in}(f)=[\text{conj}(Z_{TX}(f))]^{\wedge}-1$ and by definition $Z_{out}(f)=Z_{m2}(f)$.

$$U(f) = j\frac{Z_{in}(f)Z_{out}^*(-f) - Z_{in}^*(-f)Z_{out}(f)}{Z_{in}(f) + Z_{in}^*(-f)} \quad (5.30)$$

$$V(f) = \frac{Z_{out}(f) + Z_{out}^*(-f)}{Z_{in}(f) + Z_{in}^*(-f)} \quad (5.31)$$

$$U(f) = j\frac{Z_{TX}(f)Z_{m1}^*(-f) - Z_{TX}^*(-f)Z_{m1}(f)}{Z_{TX}(f) + Z_{TX}^*(-f)} \quad (5.32)$$

$$V(f) = \frac{Z_{m1}(f) + Z_{m1}^*(-f)}{Z_{TX}(f) + Z_{TX}^*(-f)} \quad (5.33)$$

$$U(f) = j\frac{Z_{TX}(f)Z_{m2}^*(-f) - Z_{TX}^*(-f)Z_{m2}(f)}{Z_{TX}(f) + Z_{TX}^*(-f)} \quad (5.34)$$

$$V(f) = \frac{Z_{TX}(f)Z_{TX}^*(-f)[Z_{m2}(f) + Z_{m2}^*(-f)]}{Z_{TX}(f) + Z_{TX}^*(-f)} \quad (5.35)$$

Since the receiver has remained fixed in each of the inline and crossed configurations, U(f) from equation 5.32 and 5.34 are equivalent. As a result, 5.36 results from setting equation 5.32 equal to 5.34 and simplifying. The same is true for V(f) in equations 5.33 and 5.35 so that equation 5.37 results from setting them equal to each other and simplifying. Solving for the transmitter's impairments gives equations 5.38 and 5.39.

$$M(f) = \frac{Z_{TX}(f)}{Z_{TX}^*(-f)} = \frac{Z_{m1}(f) - Z_{m2}(f)}{Z_{m1}^*(-f) - Z_{m2}^*(-f)} \quad (5.36)$$

$$N(f) = Z_{TX}(f)Z_{TX}^*(-f) = \frac{Z_{m1}(f) + Z_{m1}^*(-f)}{Z_{m2}(f) + Z_{m2}^*(-f)} \quad (5.37)$$

$$Z_{TX}(f)=\sqrt{M(f)N(f)} \quad (5.38)$$

$$Z_{TX}(-f) = \sqrt{\frac{N^*(f)}{M^*(f)}} \quad (5.39)$$

If the transmitter does not contain any cross terms, then the impairments take on conjugate symmetry just as any real signal. As a result, equations 5.41 and 5.42 give the simplified transmitter gain imbalance and phase skew assuming zero cross terms.

$$\text{if } Z_{TX}(f)=Z_{TX}^*(-f) \text{ then } M(f)=1 \quad (5.40)$$

$$Z_{TX}(f)=\sqrt{N(f)} \quad (5.41)$$

$$Z_{TX}(-f)=\sqrt{N^*(f)} \quad (5.42)$$

Now that the gain imbalance and phase skew of the transmitter have been determined, the receiver's impairments in the form of U(f) and V(f) can be found by using equations 5.31 and 5.32. Equation 5.43 was determined by setting the input of equation 5.8 to be equal to one and the output equal to the receiver's impairments. Substituting U(f) and V(f) from equations 5.31 and 5.32 into 5.43 yields equation 5.44. Then the gain imbalance $g_{RX}(f)$ and phase skew $\phi_{RX}(f)$ can be determined by using equation 5.44 or equations 5.45 and 5.46. These can be simplified further although not shown for the case that there are no transmitter cross terms using the knowledge that $Z_{TX}(f)=\text{conj}(Z_{TX}(-f))$.

$$Z_{RX}(f)=jU(f)+V(f)=g_{RX}(f)e^{j\phi_{RX}(f)} \quad (5.43)$$

$$Z_{RX}(f) = \frac{Z_{m1}(f)(1 + Z_{TX}^*(-f)) + Z_{m1}^*(-f)(1 - Z_{TX}(f))}{Z_{TX}(f) + Z_{TX}^*(-f)} \quad (5.44)$$

$$g_{RX}(f) = Mag\left(\frac{Z_{m1}(f)(1 + Z_{TX}^*(-f)) + Z_{m1}^*(-f)(1 - Z_{TX}(f))}{Z_{TX}(f) + Z_{TX}^*(-f)}\right) \quad (5.45)$$

$$\phi_{RX}(f) = Phase\left(\frac{Z_{m1}(f)(1 + Z_{TX}^*(-f)) + Z_{m1}^*(-f)(1 - Z_{TX}(f))}{Z_{TX}(f) + Z_{TX}^*(-f)}\right) \quad (5.46)$$

Cross Talk vs. Cross Terms

In the above derivations, there were many references to making simplifying assumptions by assuming that there were not any cross terms. At the surface, this condition would appear that there should be zero cross talk between the I and Q channels. However, while this is a sufficient condition to insure zero cross terms, it is not a required condition. Zero cross talk means that there will be zero cross terms, but zero cross terms does not mean that the cross talk must be zero. In order for cross terms to not exist, the cross talk between I→Q must be equal to the cross talk that exists from Q→I. As a result, it is important that the cross talk is symmetric in order to meet this criteria. It turns out that the magnitude of the U(f) term used in the equations describes only the magnitude of the asymmetric cross talk.

When correcting for IQ impairments using the architecture described in the section entitled "Impairment Derivation", the filters will not correct for cross talk unless zero cross talk exists from Q to I. Instead the filters will make the I to Q cross talk match the Q to I cross talk.

Noise Performance

One might wonder why it would ever be advantageous to not use the most general form for separating the transmitter and receiver impairments. The most general form given by equations 5.31 and 5.32 has the issue that it exaggerates noise more than assuming that either the transmitter or receiver do not contain cross terms. As a result, it is better to use one of the less general derivations if it is found that there is not any cross-talk on the receiver or the transmitter. Below are graphs taken from simulation that show the difference in noise performance for the different calculations. In each graph, a plot of the gain imbalance error between the actual gain imbalance and calculated gain imbalance given the inline and crossed loopback measurements. Shown in solid line is the error of the receiver, and in dotted line, the error of the transmitter. In the case that there is an assumption about cross terms, the data set used for simulation adheres to the needed assumption. Note that the scale of the y-axis changes. Phase skew shows the same noise performance as gain imbalance but is not shown below.

Since the noise of the calculation scales with the noise present in the original measurement averaging more on the measurement helps to decrease calculation noise. However, this noise is also dependent on the actual gain imbalance and phase skew of the receiver and transmitter. This can be seen in the M(f) term in equation 5.29. When the two different measured gain imbalances are very close to one, M(f) becomes unstable in the presence of noise. This knowledge can be used as an advantage to decrease the noise in the calculation. An intentional gain imbalance applied at the transmitter and then removed after the calculation makes the inline and crossed measurements move away from a unity gain imbalance and thus decreases the noise in the calculation. The following plots show the noise of the general calculation with different intentional gain imbalances applied at the transmitter and then removed after the calculation. The setup for these simulation results is the same as above.

Cable Swap Considerations

In the mathematical model described above, it is assumed that the cable swap is perfect. However, this is never the case in a real system. Depending on the quality of the desired correction and the tolerances this may or may not be an issue. For example, the cables used for loopback may not be "matched length". Even if the phase skew is not an issue by using "match length" cables, multiple cables could have a different relative magnitude response. Another factor to consider is the connection repeatability. While using an SMA connection with a calibrated torque will most likely not cause an issue for most all baseband signals, MCX or SMB connectors could show issues as they can't be torqued to a calibrated value. Differential signals add yet another consideration.

Some of these issues can be mostly mitigated by making multiple measurements. When calibrating the baseband transmitter, swap the cables on the transmitter's side of the cables. This allows any impairments caused by mismatched cables to be included with the receiver's impairments effectively allowing a calibration at the transmitter's connectors. Then when calibrating the receiver, perform a separate set of measurements where the cable crossing occurs at the receiver's side of the cables. As was the case with the transmitter, this will place impairments due to cable mismatches to now appear as part of the transmitter. Using this method will take at a minimum three measurements, a single inline measurement and different two crossed measurements. If using a differential system, the differential cables can be swapped and the results averaged. This will remove any gain or phase matching of the differential cables. This means that six different measurement will need to be taken to remove all cable mismatch in a differential system.

Impairment Derivation

Figure 13:
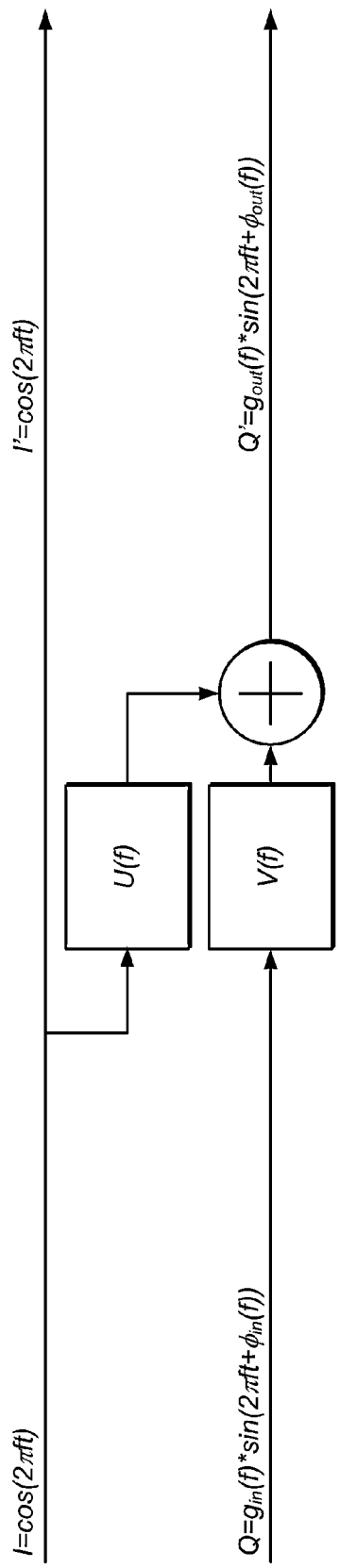
FIG. 13 illustrates one embodiment of a general system model for derivation of impairment equations.

FIG. 13 illustrates one embodiment of a general system model. (If Q' is set equal to sin(2πft), then the model specializes to an impairment-correction model. If Q is set equal to sin(2πft), then the model specializes to a corruption model, i.e, a model of how impairments are introduced into the system.)

$$u(t) * \cos(2\pi ft) + v(t) * g_{in}(f)\sin(2\pi ft + \phi_{in}(f)) = \quad (7.5)$$
$$g_{out}(f)\sin(2\pi ft + \phi_{out}(f))$$

$$U(f)\frac{e^{j2\pi ft}}{2} + U(-f)\frac{e^{j2\pi ft}}{2} + \quad (7.6)$$
$$V(f)g_{in}(f)\frac{e^{j(2\pi ft + \phi_{in}(f))}}{2j} - V(-f)g_{in}(f)\frac{e^{-j(2\pi ft + \phi_{in}(f))}}{2j} =$$
$$g_{out}(f)\frac{e^{j(2\pi ft + \phi_{out}(f))}}{2j} - g_{out}(f)\frac{e^{-j(2\pi ft + \phi_{in}(f))}}{2j}$$

$$j*U(f) + V(f)g_{in}(f)e^{j\phi_{in}(f)} = g_{out}(f)e^{j\phi_{out}(f)} \quad (7.7)$$

$$jU(-f) - V(-f)g_{in}(f) * e^{-j\phi_{in}(f)} = -g_{out}(f)e^{-j\phi_{out}(f)} \quad (7.8a)$$

$$jU(f) - V(f)g_{in}(-f)e^{-j\phi_{in}(-f)} = -g_{out}(-f)e^{-j\phi_{out}(-f)} \quad (7.8b)$$

Solve for the Filter Responses

Given the impairments at the input and at the output, solve for the frequency response of U(f) and V(f)

$$\begin{bmatrix} j & g_{in}(f)e^{j\phi_{in}(f)} \\ j & -g_{in}(-f)e^{-j\phi_{in}(-f)} \end{bmatrix} \begin{bmatrix} U(f) \\ V(F) \end{bmatrix} = \begin{bmatrix} g_{out}(f)e^{j\phi_{out}(f)} \\ -g_{out}(-f)e^{j\phi_{out}(-f)} \end{bmatrix} \quad (7.10)$$

$$\begin{bmatrix} U(f) \\ V(F) \end{bmatrix} = \frac{\begin{bmatrix} -g_{in}(-f)e^{-j\phi_{in}(-f)} & -g_{in}(f)e^{j\phi_{in}(f)} \\ -j & j \end{bmatrix} \begin{bmatrix} g_{out}(f)e^{j\phi_{out}(f)} \\ -g_{out}(-f)e^{j\phi_{out}(-f)} \end{bmatrix}}{-j * g_{in}(-f)e^{-j\phi_{in}(-f)} - jg_{in}(f) * e^{j\phi_{in}(f)}} \quad (7.11)$$

$$\begin{bmatrix} U(f) \\ V(F) \end{bmatrix} = \frac{\begin{bmatrix} jg_{in}(-f)e^{-j\phi_{in}(-f)} & jg_{in}(f)e^{j\phi_{in}(f)} \\ -1 & 1 \end{bmatrix} \begin{bmatrix} g_{out}(f)e^{j\phi_{out}(f)} \\ -g_{out}(-f)e^{j\phi_{out}(-f)} \end{bmatrix}}{-g_{in}(-f)e^{-j\phi_{in}(-f)} - g_{in}(f)e^{j\phi_{in}(f)}} \quad (7.12)$$

$$U(f) = j\frac{\left\{ \begin{array}{c} g_{in}(f)g_{out}(-f)e^{j(\phi_{in}(f)-\phi_{out}(-f))} \\ -g_{in}(-f)g_{out}(f)e^{j(\phi_{out}(f)-\phi_{in}(-f))} \end{array} \right\}}{g_{in}(f)e^{j\phi_{in}(f)} + g_{in}(-f)e^{-j\phi_{in}(-f)}} \quad (7.13)$$

$$U(f) = \frac{g_{out}(f)e^{j\phi_{out}(f)} + g_{out}(-f)e^{-j\phi_{out}(-f)}}{g_{in}(f)e^{j\phi_{in}(f)} + g_{in}(-f)e^{-j\phi_{in}(-f)}} \quad (7.14)$$

The equations above are replicated in FIG. 14.

Solve for the Output Impairments Given the input impairments and the frequency response of the filters U(f) and V(f), determine the output impairments. It may appear from equations (7.7) and (7.8) that calculating the output impairments is not possible because the problem is over determined. However, since U(f) and V(f) are both real valued filters, there is a direct relationship between their positive and negative frequency responses. Specifically, they are complex conjugates so that U(f)=U*(-f) and V(f)=V*(-f). Therefore $$g_{out}(f) = \text{Mag}(jU(f) + V(f)g_{in}(f)*e^{j\phi_{in}(f)}) \quad (7.15)$$

$$\phi_{out}(f) = \text{Phase}(jU(f) + V(f)g_{in}(f)*e^{j\phi_{in}(f)}) \quad (7.16)$$

Solve for the Input Impairments $$g_{in}(f) = \text{Mag}\left(\frac{g_{out}(f)*e^{j\phi_{out}(f)} - jU(f)}{V(f)}\right) \quad (7.17)$$

$$\phi_{in}(f) = \text{Phase}\left(\frac{g_{out}(f)*e^{j\phi_{out}(f)} - jU(f)}{V(f)}\right) \quad (7.18)$$

Additional embodiments are disclosed in the following numbered paragraphs. (Any of the following embodiments may include any subset of the features, elements and embodiments described above.)

1. A method for determining I/Q impairments of a waveform generator and/or a waveform digitizer, the method comprising:

(a) after connecting an I output and a Q output of the waveform generator respectively to an I input and Q input of the waveform digitizer using respectively a first electrical conductor and a second electrical conductor, directing the waveform generator to produce a calibration signal at its I output and Q output, and directing the waveform digitizer to capture a first set of I/Q samples in response to the generation of the calibration signal (e.g., the I/Q samples may be samples of the vector input comprising the I input and the Q input)

(b) after connecting the I output and the Q output of the waveform generator respectively to the Q input and the I input of the waveform digitizer using the first and second electrical conductors, directing the waveform generator to produce the calibration signal at its I output and Q output, and directing the waveform digitizer to capture a second set of I/Q samples in response to the generation of the calibration signal (e.g., the I/Q samples are samples of the vector input comprising the I input and the Q input];

(c) computing a measurement of I/Q impairments of the waveform generator and/or a measurement of I/Q impairments of the waveform digitizer based on input data including the first sample set and the second sample set.

1B. The method of paragraph 1, wherein the I/Q impairments of the waveform generator include a magnitude imbalance (i.e., gain imbalance) and phase imbalance (i.e., phase skew) between I and Q channels of the waveform generator.

1C. The method of paragraph 1, wherein the I/Q impairments of the waveform digitizer include a magnitude imbalance (i.e., gain imbalance) and phase imbalance (i.e., phase skew) between I and Q channels of the waveform digitizer.

2. The method of paragraph 1, further comprising: storing the computed measurement of I/Q impairments of the waveform generator and/or the computed measurement of I/Q impairments of the waveform digitizer in a memory.

3. The method of paragraph 1, further comprising: correcting the I/Q impairments of the waveform generator using the measurement of the I/Q impairments of the waveform generator.

3B. The method of paragraph 3, wherein said correcting the I/Q impairments of the waveform generator includes programming a programmable hardware element (such as an FPGA) in the waveform generator to implement a correction filter, wherein coefficients of the filter are determined from the measurement of the I/Q impairments of the waveform generator.

4. The method of paragraph 1, further comprising: correcting the I/Q impairments of the waveform digitizer using the measurement of the I/Q impairments of the waveform digitizer.

4B. The method of paragraph 3, wherein said correcting the I/Q impairments of the waveform digitizer includes programming a programmable hardware element (such as an FPGA) in the waveform digitizer to implement a correction filter, wherein coefficients of the filter are determined from the measurement of the I/Q impairments of the waveform digitizer.

5. The method of paragraph 1, wherein said connecting the I output and the Q output of the waveform generator respectively to the Q input and the I input of the waveform digitizer comprises: connecting the first electrical conductor from the I output of the waveform generator to the Q input of the waveform digitizer; and connecting the second electrical conductor from the Q output of the waveform generator to the I input of the waveform digitizer.

6. The method of paragraph 1, wherein said connecting the I output and the Q output of the waveform generator respectively to the Q input and the I input of the waveform digitizer comprises: connecting the first electrical conductor from the Q output of the waveform generator to the I input of the waveform digitizer; and connecting the second electrical conductor from the I output of the waveform generator to the Q input of the waveform digitizer.

6B. The method of paragraph 1, wherein the first electrical conductor and the second electrical conductors are electrical cables.

6C. The method of paragraph 1, wherein the first electrical conductor and the second electrical conductors are traces on a circuit board.

7. The method of paragraph 1, wherein the waveform generator is a baseband waveform generator, wherein the waveform digitizer is a baseband waveform digitizer.

8. The method of paragraph 1, wherein the calibration signal includes intentionally introduced gain and phase impairments to facilitate more accurate estimation of the I/Q impairments of the waveform generator and/or the I/Q impairments of the waveform digitizer.

9. The method of claim 1, wherein the calibration signal includes a sinusoid that is swept or stepped through a desired range of frequencies.

10. A computer system for calibrating a waveform generator and/or a waveform digitizer, wherein the waveform generator includes an I output and Q output, wherein the waveform digitizer includes an I input and a Q input, the computer system comprising: a processor; and memory that stores program instructions, wherein the program instructions, when executed by the processor, cause the processor to:

in response to a first signal indicating that a first connection configuration has been achieved between the I and Q outputs of the waveform generator and the I and Q inputs of the waveform digitizer, direct the waveform generator to produce a calibration signal at its I and Q outputs, and direct the waveform digitizer to capture a first set of I/Q samples in response to the generation of the calibration signal, wherein the first connection configuration includes a connection of a first electrical conductor between the I output of the waveform generator and the I input of the waveform digitizer, and a connection of a second electrical conductor between the Q output of the waveform generator and the Q input of the waveform digitizer; in response to a second signal indicating that a second connection configuration has been achieved between the I and Q outputs of the waveform generator and the I and Q inputs of the waveform digitizer, direct the waveform generator to produce the calibration signal at its I output and Q output, and direct the waveform digitizer to capture a second set of I/Q samples in response to the generation of the calibration signal, wherein the second connection configuration includes the first and second electrical conductors being configured so that the I output of the waveform generator is connected to the Q input of the waveform digitizer, and Q output of the waveform generator is connected to the I input of the waveform digitizer; compute a measurement of I/Q impairments of the waveform generator and/or a measurement of I/Q impairments of the waveform digitizer based on input data including the first sample set and the second sample set.

11. The computer system of paragraph 10, including any subset of the features recited above in paragraphs 1-10.

12. The computer system of paragraph 10, further comprising: an automated system configured to connect and disconnect the first and second electrical conductors from the I and Q outputs of the waveform generator and the I and Q inputs of the waveform generator in order to achieve the first connection configuration or the second connection configuration upon command from the processor.

13. A computer system for calibrating a waveform generator and/or a waveform digitizer, wherein the waveform generator includes an I output and Q output, wherein the waveform digitizer includes an I input and a Q input, the computer system comprising: a processor; and memory that stores program instructions, wherein the program instructions, when executed by the processor, cause the processor to:

in response to a first signal indicating that a first connection configuration has been achieved between the I and Q outputs of the waveform generator and the I and Q inputs of the waveform digitizer, direct the waveform generator to produce a calibration signal at its I and Q outputs, and direct the waveform digitizer to capture a first set of I/Q samples in response to the generation of the calibration signal, wherein the first connection configuration includes an electrical connection between the I output of the waveform generator and the I input of the waveform digitizer, and an electrical connection between the Q output of the waveform generator and the Q input of the waveform digitizer;

in response to a second signal indicating that a second connection configuration has been achieved between the I and Q outputs of the waveform generator and the I and Q inputs of the waveform digitizer, direct the waveform generator to produce the calibration signal at its I output and Q output, and direct the waveform digitizer to capture a second set of I/Q samples in response to the generation of the calibration signal, wherein the second connection configuration includes an electrical connection between the I output of the waveform generator and the Q input of the waveform digitizer, and an electrical connection between the Q output of the waveform generator and the I input of the waveform digitizer;

compute a measurement of I/Q impairments of the waveform generator and/or a measurement of I/Q impairments of the waveform digitizer based on input data including the first sample set and the second sample set.

13B. The computer system of paragraph 13, wherein an electronic switching device is coupled to the I and Q outputs of the waveform generator and the I and Q inputs of the waveform digitizer, wherein the electronic switching device is configured to establish the first connection configuration or the second connection configuration upon command from the processor.

13C. The computer system of paragraph 13B, wherein the waveform generator and the waveform digitizer are incorporated in a common enclosure with the electronic switching device.

13D. The computer system of paragraph 13B, wherein the electronic switching device includes a relay.

13E. The computer system of paragraph 13, including any subset of the features recited above in paragraphs 1-10.

14. A non-transitory computer-readable memory medium for calibrating a waveform generator and/or a waveform digitizer, wherein the waveform generator includes an I output and Q output, wherein the waveform digitizer includes an I input and a Q input, wherein the memory medium stores program instructions, wherein the program instructions, when executed by a computer system, cause the computer system to:

in response to a first signal indicating that a first connection configuration has been achieved between the I and Q outputs of the waveform generator and the I and Q inputs of the waveform digitizer, direct the waveform generator to produce a calibration signal at its I and Q outputs, and direct the waveform digitizer to capture a first set of I/Q samples in response to the generation of the calibration signal, wherein the first connection configuration includes a connection of a first electrical conductor between the I output of the waveform generator and the I input of the waveform digitizer, and a connection of a second electrical conductor between the Q output of the waveform generator and the Q input of the waveform digitizer;

in response to a second signal indicating that a second connection configuration has been achieved between the I and Q outputs of the waveform generator and the I and Q inputs of the waveform digitizer, direct the waveform generator to produce the calibration signal at its I output and Q output, and direct the waveform digitizer to capture a second set of I/Q samples in response to the generation of the calibration signal, wherein the second connection configuration includes the first and second electrical conductors being configured so that the I output of the waveform generator is connected to the Q input of the waveform digitizer, and Q output of the waveform generator is connected to the I input of the waveform digitizer;

compute a measurement of I/Q impairments of the waveform generator and/or a measurement of I/Q impairments of the waveform digitizer based on input data including the first sample set and the second sample set.

15. The memory medium system of paragraph 14, including any subset of the features recited above in paragraphs 1-12.

16. A method for correcting baseband I/Q impairments in a waveform generator, wherein the waveform generator has an I channel and a Q channel, the method comprising:

programming a digital correction circuit in the waveform generator to implement a digital filter, wherein the digital correction circuit is configured prior to digital-to-analog conversion in the waveform generator, wherein the digital filter includes at least one inline filter and at least one cross filter, wherein each inline filter is applied to either the I channel or the Q channel, wherein each cross filter crosses from the I channel to the Q channel or vice versa.

16B. The method of paragraph 16, wherein the digital filter includes only one inline filter and only one cross filter, wherein the inline filter and cross filter are configured so that only one of the following conditions hold:

(a) the inline filter is applied to the Q channel and the cross filter crosses from the I channel to the Q channel;

(b) the inline filter is applied to the Q channel and the cross filter crosses from the Q channel to the I channel;

(c) the inline filter is applied to the I channel and the cross filter crosses from the I channel to the Q channel;

(d) the inline filter is applied to the I channel and the cross filter crosses from the Q channel to the I channel.

17. The method of paragraph 16, wherein the cross filter compensates for unmatched cross talk between the channels, wherein the inline filter compensates for I/Q impairments occurring in the I channel and Q channel.

18. The method of paragraph 16, wherein the cross filter is identically zero, wherein the inline filter compensates for I/Q impairments occurring in the I channel and Q channel.

19. A method for correcting for baseband I/Q impairments in a waveform digitizer, wherein the waveform digitizer has I and Q channels, the method comprising:

programming a digital correction circuit in the waveform digitizer to implement a digital filter, wherein the digital correction circuit is configured after to analog-to-digital conversion in the waveform digitizer, wherein the digital filter includes at least one inline filter and at least one cross filter, wherein each inline filter is applied to either the I channel or the Q channel, wherein each cross filter crosses from the I channel to the Q channel or vice versa.

19B. The method of paragraph 19, wherein the digital filter includes only one inline filter and only one cross filter, wherein the inline filter and cross filter are configured so that only one of the following conditions hold:

(a) the inline filter is applied to the Q channel and the cross filter crosses from the I channel to the Q channel;

(b) the inline filter is applied to the Q channel and the cross filter crosses from the Q channel to the I channel;

(c) the inline filter is applied to the I channel and the cross filter crosses from the I channel to the Q channel;

(d) the inline filter is applied to the I channel and the cross filter crosses from the Q channel to the I channel.

20. The method of paragraph 19, wherein the cross filter compensates for unmatched cross talk between the channels, wherein the inline filter compensates for I/Q impairments occurring in the I channel and Q channel.

21. The method of paragraph 19, wherein the cross filter is identically zero, wherein the inline filter compensates for I/Q impairments occurring in the I channel and Q channel.

22. A computer system comprising: a processor; and memory that stores program instructions, wherein the program instructions, when executed by the processor, cause the processor to perform the method recited in any one of the paragraphs 16-21.

22. A non-transitory computer-readable memory medium that stores program instructions, wherein the program instructions, when executed by a computer system, cause the computer system to perform the method recited in any one of the paragraphs 16-21.

Computer System

Figure 15:
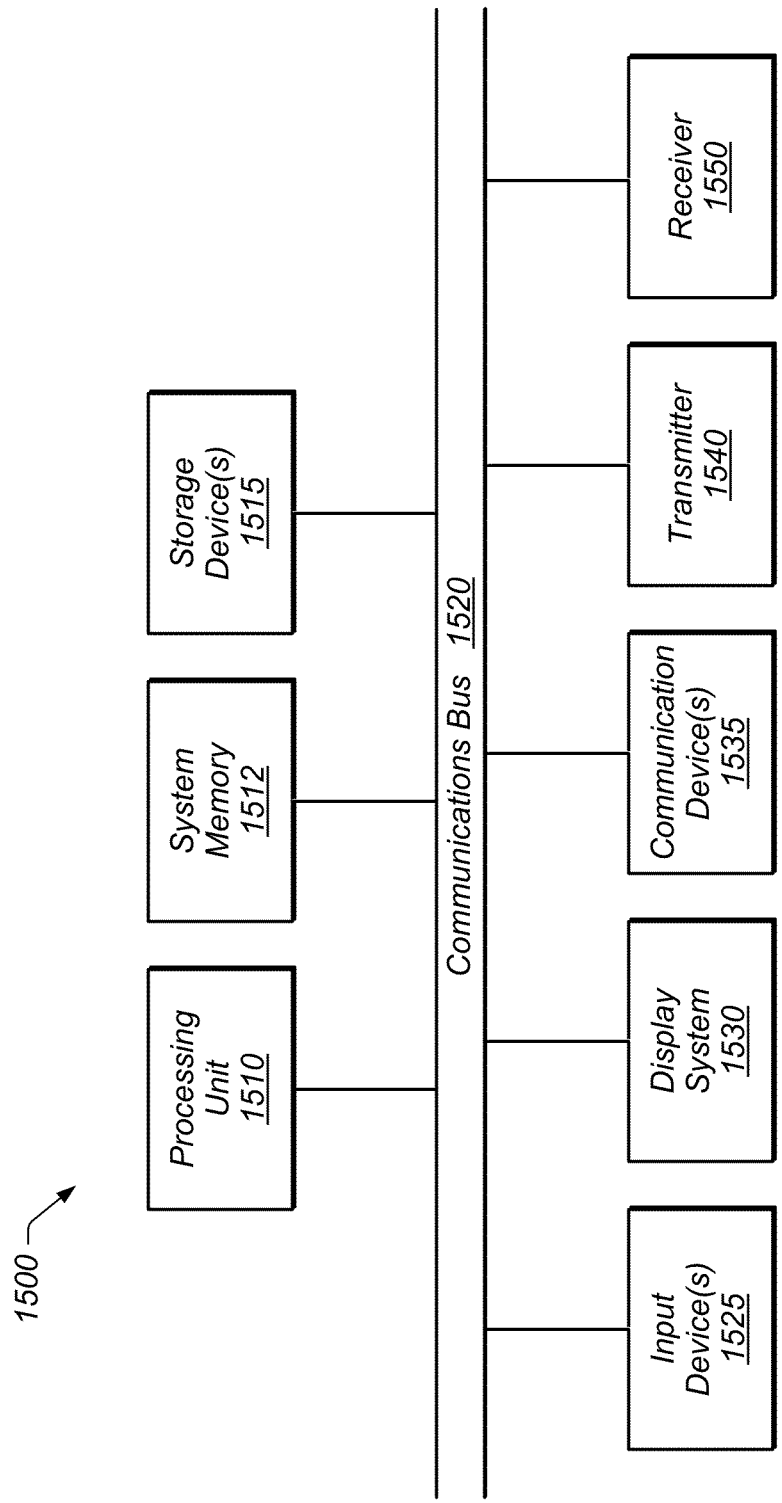
FIG. 15 illustrates one embodiment of a computer system 1500 that may be used to perform any of the method embodiments described herein.

FIG. 15 illustrates one embodiment of a computer system 1500 that may be used to perform any of the method embodiments described herein, or, any combination of the method embodiments described herein, or any subset of any of the method embodiments described herein, or, any combination of such subsets.

Computer system 1500 may include a processing unit 1510, a system memory 1512, a set 1515 of one or more storage devices, a communication bus 1520, a set 1525 of input devices, and a display system 1530.

System memory 1512 may include a set of semiconductor devices such as RAM devices (and perhaps also a set of ROM devices).

Storage devices 1515 may include any of various storage devices such as one or more memory media and/or memory access devices. For example, storage devices 1515 may include devices such as a CD/DVD-ROM drive, a hard disk, a magnetic disk drive, magnetic tape drives, etc.

Processing unit 1510 is configured to read and execute program instructions, e.g., program instructions stored in system memory 1512 and/or on one or more of the storage devices 1515. Processing unit 1510 may couple to system memory 1512 through communication bus 1520 (or through a system of interconnected busses, or through a network). The program instructions configure the computer system 1500 to implement a method, e.g., any of the method embodiments described herein, or, any combination of the method embodiments described herein, or, any subset of any of the method embodiments described herein, or any combination of such subsets.

Processing unit 1510 may include one or more processors (e.g., microprocessors).

One or more users may supply input to the computer system 1500 through the input devices 1525. Input devices 1525 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 1530 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 1500 may include other devices, e.g., devices such as one or more graphics accelerators, one or more speakers, a sound card, a video camera and a video card, a data acquisition system.

In some embodiments, computer system 1500 may include one or more communication devices 1535, e.g., a network interface card for interfacing with a computer network. As another example, the communication device 1535 may include a specialized interface for communication via any of a variety of established communication standards or protocols (e.g., USB, Firewire, PCI, PCI Express, PXI).

The computer system may be configured with a software infrastructure including an operating system, and perhaps also, one or more graphics APIs (such as OpenGL®, Direct3D, Java 3D™). In some embodiments, the software infrastructure may include National Instruments LabVIEW™ software, and/or, LabVIEW™ FPGA.

In some embodiments, the computer system 00 may be configured to interface with transmitter 1540 (e.g., a waveform generator). The transmitter may be configured to generate an I output signal and a Q output signal, e.g., as variously described herein. The transmitter may operate under the control of software executing on processor 1510 and/or software executing on the transmitter itself.

In some embodiments, the computer system 1500 may be configured to interface with a receiver 1550 (e.g., a waveform digitizer). The receiver may be configured to receive an I input signal and a Q input signal, e.g., as variously described herein. The receiver may operate under the control of software executing on processor 1510 and/or software executing on the receiver itself.

In some embodiments, the transmitter and/or the receiver may include one or more programmable hardware elements and/or one or more microprocessors for performing digital processing on digital data (e.g., on digital baseband signals), e.g., as variously described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for determining gain and/or phase imbalance of a signal generation system and/or a signal digitizing system, the method comprising:
    (a) after a first output and a second output of the signal generation system has been connected respectively to a first input and a second input of the signal digitizing system using respectively a first electrical conductor and a second electrical conductor, directing the signal generation system to generate a first vector calibration signal and to transmit a first vector output signal via the first output and the second output based on the first vector calibration signal, and directing the signal digitizing system to capture a first set of vector samples from the first input and second input in response to the transmission of the first vector output signal;
    (b) after the first output and the second output of the signal generation system have been connected respectively to the second input and the first input of the signal digitizing system using the first and second electrical conductors, directing the signal generation system to generate a second vector calibration signal and transmit a second vector output signal based on the second vector calibration signal, and directing the signal digitizing system to capture a second set of vector samples from the first input and second input in response to the transmission of the second vector output signal;
    (c) computing a measurement of gain and/or phase imbalance of the signal generation system and/or a measurement of gain and/or phase imbalance of the signal digitizing system based on input data including the first set of vector samples and the second set of vector samples.

2. The method of claim 1, wherein the signal generation system includes a single dual-channel waveform generator or two single-channel waveform generators, wherein the signal digitizing system includes a single dual-channel waveform digitizer or two single-channel waveform digitizers.

3. The method of claim 1, wherein the first vector calibration signal and the second vector calibration signal are identical.

4. The method of claim 1,
    wherein the signal generation system is a waveform generator, wherein the first and second outputs are respectively I and Q outputs of the I/Q waveform generator,
    wherein the signal digitizing system is a waveform digitizer, wherein the first and second inputs are respectively I and Q inputs of the waveform digitizer.

5. The method of claim 4, wherein said gain and/or phase imbalance of the signal generation system includes a magnitude imbalance and phase imbalance between I and Q channels of the waveform generator.

6. The method of claim 4, wherein said gain and/or phase imbalance of the signal digitizing system includes a magnitude imbalance and phase imbalance between I and Q channels of the waveform digitizer.

7. The method of claim 1, further comprising:
storing the measurement of gain and/or phase imbalance of the signal generation system and/or the measurement of gain and/or phase imbalance of the signal digitizing system in a memory.

8. The method of claim 1, further comprising:
correcting the phase and/or gain imbalance of the signal generation system using the measurement of the phase and/or gain imbalance of the signal generation system.

9. The method of claim 1, wherein said correcting the phase and/or gain imbalance of the signal generation system includes programming a programmable hardware element in the signal generation system to implement a correction filter, wherein coefficients of the filter are determined from the measurement of the gain and phase imbalance of the signal generation system.

10. The method of claim 1, further comprising:
correcting the phase and/or gain imbalance of the signal digitizing system using the measurement of the gain and/or phase imbalance of the signal digitizing system.

11. The method of claim 10, wherein said correcting the phase and/or gain imbalance of the signal digitizing system includes programming a programmable hardware element in the signal digitizing system to implement a correction filter, wherein coefficients of the filter are determined from the measurement of the gain and/or phase imbalance of the signal digitizing system.

12. The method of claim 1, wherein said connecting the first output and the second output of the signal generation system respectively to the second input and the first input of the signal digitizing system includes:
connecting the first electrical conductor from the first output of the signal generation system to the second input of the signal digitizing system; and
connecting the second electrical conductor from the second output of the signal generation system to the first input of the signal digitizing system.

13. The method of claim 1, wherein said connecting the first output and the second output of the signal generation system respectively to the second input and the first input of the signal digitizing system includes:
connecting the first electrical conductor from the second output of the signal generation system to the first input of the signal digitizing system; and
connecting the second electrical conductor from the first output of the signal generation system to the second input of the signal digitizing system.

14. The method of claim 1, wherein:
the first electrical conductor and the second electrical conductor are electrical cables; or
the first electrical conductor and the second electrical conductor are traces on a circuit board.

15. The method of claim 1, wherein the signal generation system is a baseband I/Q waveform generator, wherein the waveform digitizing system is a baseband I/Q waveform digitizer.

16. The method of claim 1, wherein the first vector calibration signal and/or the second vector calibration signal includes intentionally-introduced gain and phase impairments to facilitate more accurate estimation of the gain and/or phase imbalance of the signal generation system and/or the signal digitizing system.

17. The method of claim 1, wherein the first vector calibration signal and/or the second vector calibration signal includes a complex exponential signal that is swept or stepped through a desired range of frequencies.

18. A computer system for determining gain and/or phase imbalance of a signal generation system and/or a signal digitizing system, wherein the signal generation system includes a first output and a second output, wherein the signal digitizing system includes a first input and a second input, the computer system comprising:
a processor; and
memory that stores program instructions, wherein the program instructions, when executed by the processor, cause the processor to:
in response to a first signal indicating that a first connection configuration has been achieved between the first and second outputs of the signal generation system and the first and second inputs of the signal digitizing system, direct the signal generation system to generate a first vector calibration signal and transmit a first vector output signal via the first and second outputs based on the first vector calibration signal, and direct the signal digitizing system to capture a first set of vector samples from the first input and second input in response to the transmission of the first vector output signal, wherein the first connection configuration includes a connection of a first electrical conductor between the first output and the first input, and a connection of a second electrical conductor between the second output and the second;
in response to a second signal indicating that a second connection configuration has been achieved between the first and second outputs of the signal generation system and the first and second inputs of the signal digitizing system, direct the signal generation system to generate a second vector calibration signal and transmit a second vector output signal via the first and second outputs based on the second vector calibration signal, and direct the signal digitizing system to capture a second set of vector samples from the first input and second input in response to the transmission of the second vector output signal, wherein the second connection configuration includes the first and second electrical conductors being configured so that the first output is connected to the second input, and second output is connected to the first input;
compute a measurement of gain and/or phase imbalance of the signal generation system and/or a measurement of gain and/or phase imbalance of the signal digitizing system based on input data including the first set of vector samples and the second set of vector samples.

19. The method of claim 18, wherein the first vector calibration signal and the second vector calibration signal are identical.

20. The computer system of claim 18, further comprising:
an automated system configured to connect and disconnect the first and second electrical conductors from the first and second outputs of the signal generation system and the first and second inputs of the signal digitizing system in order to achieve the first connection configuration or the second connection configuration upon command from the processor.

21. A computer system for determining gain and/or phase imbalance of a signal generation system and/or a signal digitizing system, wherein the signal generation system includes a first output and a second output, wherein the signal digitizing system includes a first input and a second input, the computer system comprising:
  a processor; and
  memory that stores program instructions, wherein the program instructions, when executed by the processor, cause the processor to:
    in response to a first indication indicating that a first connection configuration has been achieved between the first and second outputs of the signal generation system and the first and second inputs of the signal digitizing system, direct the signal generation system to generate a first vector calibration signal and transmit a first vector output signal via the first and second outputs based on the first vector calibration signal, and direct the signal digitizing system to capture a first set of vector samples in response to the transmission of the first vector output signal, wherein the first connection configuration includes an electrical connection between the first output and the first input, and an electrical connection between the second output and the second input;
    in response to a second indication indicating that a second connection configuration has been achieved between the first and second outputs of the signal generation system and the first and second inputs of the signal digitizing system, direct the signal generation system to generate a second vector calibration signal and transmit the second vector output signal via the first and second outputs based on the second vector calibration signal, and direct the signal digitizing system to capture a second set of vector samples in response to the transmission of the second vector calibration signal, wherein the second connection configuration includes an electrical connection between the first output and the second input, and an electrical connection between the second output and the first input;
    compute a measurement of gain and/or phase imbalance of the signal generation system and/or a measurement of gain and/or phase imbalance of the signal digitizing system based on input data including the first set and the second set of vector samples.

22. The method of claim 21, wherein the first vector calibration signal and the second vector calibration signal are identical.

23. The computer system of claim 21, wherein an electronic switching device is coupled to the first and second outputs of the signal generation system and the first and second inputs of the signal digitizing system, wherein the electronic switching device is configured to establish the first connection configuration or the second connection configuration upon command from the processor.

24. The computer system of claim 23, wherein the signal generation system and the signal digitizing system are incorporated in a common enclosure with the electronic switching device.

25. The computer system of claim 23, wherein the electronic switching device includes a relay.

26. A method for correcting baseband gain and/or phase imbalance impairments between a first signal output path and a second signal output path in a signal generation system, the method comprising:
  programming a digital correction circuit in the signal generation system to implement a digital filter, wherein the digital correction circuit is configured at a location upstream from digital-to-analog conversion in the signal generation system, wherein the digital filter includes at least one inline filter and at least one cross filter, wherein each inline filter is applied to either the first signal output path or the second signal output path, wherein each cross filter crosses from the first signal output path to the second signal output path or vice versa, wherein parameters of said at least one inline filter and parameters of said at least one cross filter have been determined based on:
    (a) a first set of vector samples captured by a signal digitizing system in response to the signal generation system's transmission of a first vector calibration signal with a first connection configuration between two outputs of the signal generation system and two inputs of the signal digitizing system; and
    (b) a second set of vector samples captured by the signal digitizing system in response to the signal generation system's transmission of a second vector calibration signal with a crossed connection configuration between the two outputs of the signal generation system and the two inputs of the signal digitizing system.

27. The method of claim 26, wherein the first vector calibration signal and the second vector calibration signal are identical.

28. The method of claim 26, wherein the signal generation system is a waveform generator, wherein the first signal output path is an I channel of the waveform generator, wherein the second signal output path is a Q channel of the waveform generator.

29. The method of claim 26, wherein the digital filter includes only one inline filter and only one cross filter, wherein the inline filter and cross filter are configured so that only one of the following conditions hold:
  (a) the inline filter is applied to the second signal output path and the cross filter crosses from the first signal output path to the second signal output path;
  (b) the inline filter is applied to the second signal output path and the cross filter crosses from the second signal output path to the first signal output path;
  (c) the inline filter is applied to the first signal output path and the cross filter crosses from the first signal output path to the second signal output path;
  (d) the inline filter is applied to the first signal output path and the cross filter crosses from the second signal output path to the second signal output path.

30. The method of claim 26, wherein the cross filter compensates for unmatched cross talk between the channels, wherein the inline filter compensates for the gain and/or phase imbalance between the first signal output path and the second signal output path.

31. The method of claim 26, wherein the cross filter is identically zero, wherein the inline filter compensates for the gain and/or phase imbalance between the first signal output path and the second signal output path.

32. A method for correcting baseband I/Q gain and/or phase imbalance impairments between a first signal input path and a second signal input path in a signal digitizing system, the method comprising:
  programming a digital correction circuit in the signal digitizing system to implement a digital filter, wherein the digital correction circuit is configured at a location downstream from analog-to-digital conversion in the signal digitizing system, wherein the digital filter includes at least one inline filter and at least one cross filter, wherein each inline filter is applied to either the first signal input path or the second signal input path, wherein each cross filter crosses from the first signal input path to the second signal input path or vice versa, wherein parameters of said at least one inline filter and parameters of said at least one cross filter have been determined based on:
- (a) a first set of vector samples captured by the signal digitizing system in response to a transmission of a first vector calibration signal by a signal generation system with a first connection configuration between two outputs of the signal generation system and two inputs of the signal digitizing system; and
- (b) a second set of vector samples captured by the signal digitizing system in response to the signal generation system's transmission of a second vector calibration signal with a crossed connection configuration between the two outputs of the signal generation system and the two inputs of the signal digitizing system.

33. The method of claim 32, wherein the first vector calibration signal and the second vector calibration signal are identical.

34. The method of claim 32, wherein the signal digitizing system is a waveform digitizer, wherein the first signal input path is an I channel of the waveform digitizer, wherein the second signal input path is a Q channel of the waveform digitizer.

35. The method of claim 32, wherein the digital filter includes only one inline filter and only one cross filter, wherein the inline filter and cross filter are configured so that only one of the following conditions hold:
- (a) the inline filter is applied to the second signal input path and the cross filter crosses from the first signal input path to the second signal input path;
- (b) the inline filter is applied to the second signal input path and the cross filter crosses from the second signal input path to the first signal input path;
- (c) the inline filter is applied to the first signal input path and the cross filter crosses from the first signal input path to the second signal input path;
- (d) the inline filter is applied to the first signal input path and the cross filter crosses from the second signal input path to the first signal input path.

36. The method of claim 32, wherein the cross filter compensates for unmatched cross talk between the first and second input paths, wherein the inline filter compensates for the gain and/or phase impairments between the first signal input path and the second signal input path.

37. The method of claim 32, wherein the cross filter is identically zero, wherein the inline filter compensates for the gain and/or phase impairments between the first signal input path and the second signal input path.

* * * * *

UNITED STATES PATENT AND TRADEMARK OFFICE
CERTIFICATE OF CORRECTION

PATENT NO.         : 8,873,610 B2                                              Page 1 of 1
APPLICATION NO.    : 14/186727
DATED              : October 28, 2014
INVENTOR(S)        : Dark It is certified that error appears in the above-identified patent and that said Letters Patent is hereby corrected as shown below:

In the Claims:

Claim 18, Column 32, Line 33, please delete "second;" and substitute -- second input; --.

Signed and Sealed this
Seventeenth Day of February, 2015

Michelle K. Lee
*Deputy Director of the United States Patent and Trademark Office*